United States Patent
Quintiliani et al.

(10) Patent No.: US 9,047,639 B1
(45) Date of Patent: Jun. 2, 2015

(54) SERVICE PARTICIPATION ACKNOWLEDGEMENT SYSTEM

(75) Inventors: John Harden Quintiliani, Charlotte, NC (US); Brian Thomas Borders, Harrisburg, NC (US); Lomney Ann Bryan, Renton, WA (US); Paul Ronald DeKoster, Matthews, NC (US); Doris Maria Garrett, Walnut Creak, CA (US); Katherine Elizabeth Sutton, Charlotte, NC (US); Tamara S. Kingston, Peoria, AZ (US); John Franklin Tuders, Harrisburg, NC (US); Erik Stephen Ross, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 662 days.

(21) Appl. No.: 12/879,866

(22) Filed: Sep. 10, 2010

(51) Int. Cl.
 *G06Q 20/00* (2012.01)
 *G06Q 40/00* (2012.01)
 *G06Q 40/02* (2012.01)

(52) U.S. Cl.
 CPC .............. *G06Q 40/02* (2013.01); *G06Q 40/025* (2013.01)

(58) Field of Classification Search
 None
 See application file for complete search history.

(56) References Cited

U.S. PATENT DOCUMENTS

| | | | |
|---|---|---|---|
| 6,021,400 A | 2/2000 | Gallacher et al. | |
| 6,081,792 A | 6/2000 | Cucinotta et al. | |
| 6,457,640 B2 | 10/2002 | Ramachandran et al. | |
| 7,216,083 B2 | 5/2007 | Parmelee et al. | |
| 7,370,004 B1 | 5/2008 | Patel et al. | |
| 7,428,495 B2 | 9/2008 | Dhar et al. | |
| 2002/0040339 A1 | 4/2002 | Dhar et al. | |
| 2002/0055904 A1 | 5/2002 | Mon | |
| 2002/0065688 A1* | 5/2002 | Charlton et al. | 705/5 |
| 2003/0009418 A1 | 1/2003 | Green et al. | |
| 2004/0215566 A1 | 10/2004 | Meurer | |
| 2006/0059085 A1* | 3/2006 | Tucker | 705/38 |
| 2006/0129478 A1 | 6/2006 | Rees | |
| 2006/0249568 A1 | 11/2006 | Scanlon | |

(Continued)

OTHER PUBLICATIONS

A-9 Model Consent Form for Overdraft Services, 1 page total; http://www.federalreserve.gov/DCCA/RegulationE/20081218/A-9.pdf.

(Continued)

*Primary Examiner* — Ryan Zeender
*Assistant Examiner* — Denisse Ortiz Roman
(74) *Attorney, Agent, or Firm* — Michael A. Springs; Moore & Van Allen PLLC; W. Kevin Ransom

(57) ABSTRACT

In general terms, embodiments of the present invention relate to methods and apparatuses for providing a service participation acknowledgment mechanism at a transaction machine. For example, in some embodiments, a method is provided that includes: (a) receiving transaction information associated with a transaction, where the transaction involves a transaction machine and a user of the transaction machine, and where the transaction information identifies an account; (b) determining, based at least partially on the transaction information, that the account will meet a pre-defined condition as a result of the transaction; (c) presenting, via a user interface associated with the transaction machine, information associated with a service to address the condition; (d) prompting, via the user interface, the user to consent to the service; (e) receiving, via the user interface, the user's consent to the service; and (f) presenting, via the user interface, a confirmation message to the user, where the confirmation message includes information that confirms the user's consent to the service.

35 Claims, 7 Drawing Sheets

(56) References Cited

U.S. PATENT DOCUMENTS

| | | |
|---|---|---|
| 2007/0080207 A1 | 4/2007 | Williams |
| 2007/0106558 A1* | 5/2007 | Mitchell et al. ............... 705/16 |
| 2007/0118470 A1 | 5/2007 | Warren et al. |
| 2007/0262137 A1 | 11/2007 | Brown |
| 2008/0103970 A1 | 5/2008 | Books et al. |
| 2009/0055313 A1 | 2/2009 | Elterich |
| 2009/0081990 A1 | 3/2009 | Granucci et al. |
| 2009/0089205 A1 | 4/2009 | Bayne |
| 2009/0171837 A1 | 7/2009 | Moreno |
| 2009/0281904 A1 | 11/2009 | Pharris |
| 2011/0125643 A1* | 5/2011 | Cameo et al. ............... 705/44 |

OTHER PUBLICATIONS http://thefinancialbrand.com/7795/fixing-overdraft-ugliness/ "5 Ideas to Fix the Ugly in Overdraft Fees", Sep. 23, 2009 (8 pages total).

* cited by examiner

SERVICE PARTICIPATION ACKNOWLEDGEMENT SYSTEM

BACKGROUND

From the perspective of a financial institution customer, it can sometimes be a complicated, cumbersome, and time-consuming process to enroll in a financial service provided by a financial institution. For example, when opening a new account, joining a rewards program, or signing up for a service that provides assistance to a customer when a draw on the customer's account exceeds a certain limit, the customer may be required to attend an in-person meeting with financial institution officials, review numerous pages of disclosure materials, and complete and sign several enrollment forms. In addition, government regulations sometimes impose requirements on both the customer and the financial institution that make the enrollment process even more complicated. Accordingly, there is a need to provide methods and apparatuses that improve over the conventional, paper-based processes through which consumers enroll in financial services.

SUMMARY OF SELECTED EMBODIMENTS OF THE PRESENT INVENTION

In general terms, embodiments of the present invention relate to methods and apparatuses for providing a service participation acknowledgment mechanism at a transaction machine. For example, in some embodiments, a method is provided that includes: (a) receiving transaction information associated with a transaction, where the transaction involves a transaction machine and a user of the transaction machine, and where the transaction information identifies an account; (b) determining, based at least partially on the transaction information, that the account will meet a pre-defined condition as a result of the transaction; (c) presenting, via a user interface associated with the transaction machine, information associated with a service to address the condition; (d) prompting, via the user interface, the user to consent to the service; (e) receiving, via the user interface, the user's consent to the service; and (f) presenting, via the user interface, a confirmation message to the user, where the confirmation message includes information that confirms the user's consent to the service.

For example, some embodiments of the present invention provide a method that includes: (a) receiving transaction information associated with a transaction, where the transaction involves a transaction machine and a user of the transaction machine, and where the transaction information identifies an account; (b) determining, based at least partially on the transaction information, that the account will incur a deposit account discrepancy as a result of the transaction; (c) presenting, via a user interface associated with the transaction machine, information associated with the deposit account discrepancy; (d) prompting, via the user interface, the user to consent to the deposit account discrepancy; (e) receiving, via the user interface, the user's consent to the deposit account discrepancy; and (f) presenting, via the user interface, a confirmation message to the user, where the confirmation message includes information that confirms the user's consent to the deposit account discrepancy.

In some embodiments, the method further includes authenticating the user (e.g., confirming the identity of the user, etc.). In other embodiments, the method additionally or alternatively includes completing the transaction based at least partially on receiving the user's consent to the deposit account discrepancy. In still other embodiments, the method includes: (a) prompting, via the user interface, the user to consent to completing the transaction; and (b) receiving, via the user interface, the user's consent to completing the transaction. In addition, in some embodiments, the method further includes completing the transaction based at least partially on receiving the user's consent to completing the transaction. In other embodiments, the confirmation message includes information that confirms the user's consent to completing the transaction.

In some embodiments, the transaction machine includes and/or is embodied as an automated teller machine (ATM). Also, in some embodiments, the transaction includes a cash withdrawal from the account. However, in other embodiments, the transaction machine includes and/or is embodied as a point of sale (POS) device. In some embodiments of the method, presenting the confirmation message to the user includes printing a receipt for the user, where the receipt includes information that confirms the user's consent to the deposit account discrepancy. In some embodiments of the method, the user's consent to the deposit account discrepancy is valid for the transaction but not for one or more future transactions. Also, in some embodiments of the method, the information associated with the deposit account discrepancy includes information associated with a deposit account discrepancy amount.

In some embodiments, the method further includes: (a) assessing the account a deposit account discrepancy amount based at least partially on determining that the account settles negative at the end of day; and/or determining not to assess the account a deposit account discrepancy amount based at least partially on determining that the account settles non-negative at the end of day. Further, in some embodiments of the method, at least one of presenting information associated with the deposit account discrepancy, receiving the user's consent to the deposit account discrepancy, or presenting the confirmation message to the user complies with one or more requirements of a deposit account discrepancy regulation.

Additionally or alternatively, in some embodiments, the method includes sending disclosure information to the user prior to receiving the transaction information, where the disclosure information defines one or more terms of a deposit account discrepancy service, and where prompting the user to consent to the deposit account discrepancy includes prompting the user to agree to the one or more terms of the deposit account discrepancy service defined in the disclosure information. Additionally or alternatively, in some embodiments of the method, prompting the user to consent to the deposit account discrepancy includes prompting the user to agree to one or more terms of the deposit account discrepancy service. Further, in some embodiments of the method, receiving the user's consent to the deposit account discrepancy includes receiving the user's agreement to the one or more terms of the deposit account discrepancy service. In some embodiments, presenting the information associated with the deposit account discrepancy includes presenting the one or more terms of the deposit account discrepancy service. Still further, in some embodiments, the confirmation message includes information that confirms the user's agreement to the one or more terms of the deposit account discrepancy service.

As another example, some embodiments of the present invention provide an apparatus that includes: (a) a user interface associated with a transaction machine, where the user interface is configured to receive one or more inputs from a user of the transaction machine and communicate one or more outputs to the user; and (b) a processor operatively connected to the user interface. The processor is configured to: (a) receive transaction information associated with a transaction, where the transaction involves the transaction machine and the user, and where the transaction information identifies an account; (b) determine, based at least partially on the transaction information, that the account will incur a deposit account discrepancy as a result of the transaction; (c) present, via the user interface, information associated with the deposit account discrepancy; (d) prompt, via the user interface, the user to consent to the deposit account discrepancy; (e) receive, via the user interface, the user's consent to the deposit account discrepancy; and (f) present, via the user interface, a confirmation message to the user, where the confirmation message includes information that confirms the user's consent to the deposit account discrepancy.

In some embodiments, the processor of the apparatus is further configured to authenticate the user. Additionally or alternatively, in some embodiments, the processor is further configured to complete the transaction based at least partially on the processor receiving the user's consent to the deposit account discrepancy. In some embodiments, the processor is further configured to: (a) prompt, via the user interface, the user to consent to completing the transaction; and (b) receive, via the user interface, the user's consent to completing the transaction. In some of these embodiments, the processor is further configured to complete the transaction based at least partially on the processor receiving the user's consent to completing the transaction. In other embodiments, the confirmation message includes information that confirms the user's consent to completing the transaction.

It will be understood that, in some embodiments, the processor is housed in the transaction machine, but in other embodiments, the processor is housed in a server located remotely from the transaction machine. In some embodiments of the apparatus, the processor is configured to present the confirmation message to the user by printing a receipt for the user, where the receipt includes information that confirms the user's consent to the deposit account discrepancy. Additionally or alternatively, in some embodiments, the processor is configured to: (a) assess the account a deposit account discrepancy amount if the account settles negative at the end of day; and/or (b) determine not to assess the account a deposit account discrepancy amount if the account settles non-negative at the end of day. In some embodiments, at least one of the processor presenting the information associated with the deposit account discrepancy, receiving the user's consent to the deposit account discrepancy, or presenting the confirmation message to the user complies with one or more requirements of a deposit account discrepancy regulation.

In some embodiments of the apparatus, the processor is configured to send disclosure information to the user prior to the processor receiving the transaction information, where the disclosure information defines one or more terms of a deposit account discrepancy service, and where the processor is configured to prompt the user to consent to the deposit account discrepancy by prompting the user to agree to the one or more terms of the deposit account discrepancy service defined in the disclosure information. In some embodiments, the processor is configured to prompt the user to consent to the deposit account discrepancy by prompting the user to agree to one or more terms of a deposit account discrepancy service. In some embodiments of the apparatus, the processor is configured to receive the user's consent to the deposit account discrepancy by receiving the user's agreement to the one or more terms of the deposit account discrepancy service. In other embodiments, the processor is configured to present the information associated with the deposit account discrepancy by presenting the one or more terms of the deposit account discrepancy service. In still other embodiments, the confirmation message includes information that confirms the user's agreement to the one or more terms of the deposit account discrepancy service.

As still another example, some embodiments of the present invention provide a computer program product that includes a non-transitory computer-readable medium. In some embodiments, the computer-readable medium includes computer-executable program code portions stored therein, and the computer-executable program code portions include: (a) a first program code portion operable to receive transaction information associated with a transaction, where the transaction involves a transaction machine and a user of the transaction machine, and where the transaction information identifies an account; (b) a second program code portion operable to determine, based at least partially on the transaction information, that the account will incur a deposit account discrepancy as a result of the transaction; (c) a third program code portion operable to present, via a user interface associated with the transaction machine, information associated with the deposit account discrepancy; (d) a fourth program code portion operable to prompt, via the user interface, the user to consent to the deposit account discrepancy; (e) a fifth program code portion operable to receive, via the user interface, the user's consent to the deposit account discrepancy; and (f) a sixth program code portion operable to present, via the user interface, a confirmation message to the user, where the confirmation message includes information that confirms the user's consent to the deposit account discrepancy.

In some embodiments, the computer program product further includes a seventh program code portion operable to authenticate the user. In some embodiments, the computer program product includes a seventh program code portion operable to complete the transaction based at least partially on the fifth program code receiving the user's consent to the deposit account discrepancy. In still other embodiments, the computer program product includes: (a) a seventh program code portion operable to prompt, via the user interface, the user to consent to completing the transaction, and (b) an eighth program code portion operable to receive, via the user interface, the user's consent to completing the transaction. In some embodiments, the computer program product further includes a ninth program code portion operable to complete the transaction based at least partially on the eighth program code portion receiving the user's consent to completing the transaction. In some embodiments, the confirmation message includes information that confirms the user's consent to completing the transaction. In still other embodiments, the sixth program code portion is operable to print a receipt for the user, where the receipt includes information that confirms the user's consent to the deposit account discrepancy.

In some embodiments, at least one of the third program code portion, fifth program code portion, or sixth program code portion complies with one or more requirements of a deposit account discrepancy regulation. Additionally or alternatively, in some embodiments, the computer program product further includes a seventh program code portion operable to send disclosure information to the user prior to the first program code portion receiving the transaction information, where the disclosure information defines one or more terms of a deposit account discrepancy service, and the fourth program code portion is operable to prompt the user to agree to the one or more terms of the deposit account discrepancy service defined in the disclosure information. In some embodiments of the computer program product, the fourth program code portion is operable to prompt the user to agree to one or more terms of a deposit account discrepancy service, and the fifth program code portion is operable to receive the user's agreement to the one or more terms of the deposit account discrepancy service.

BRIEF DESCRIPTION OF THE DRAWINGS

Figure 1:
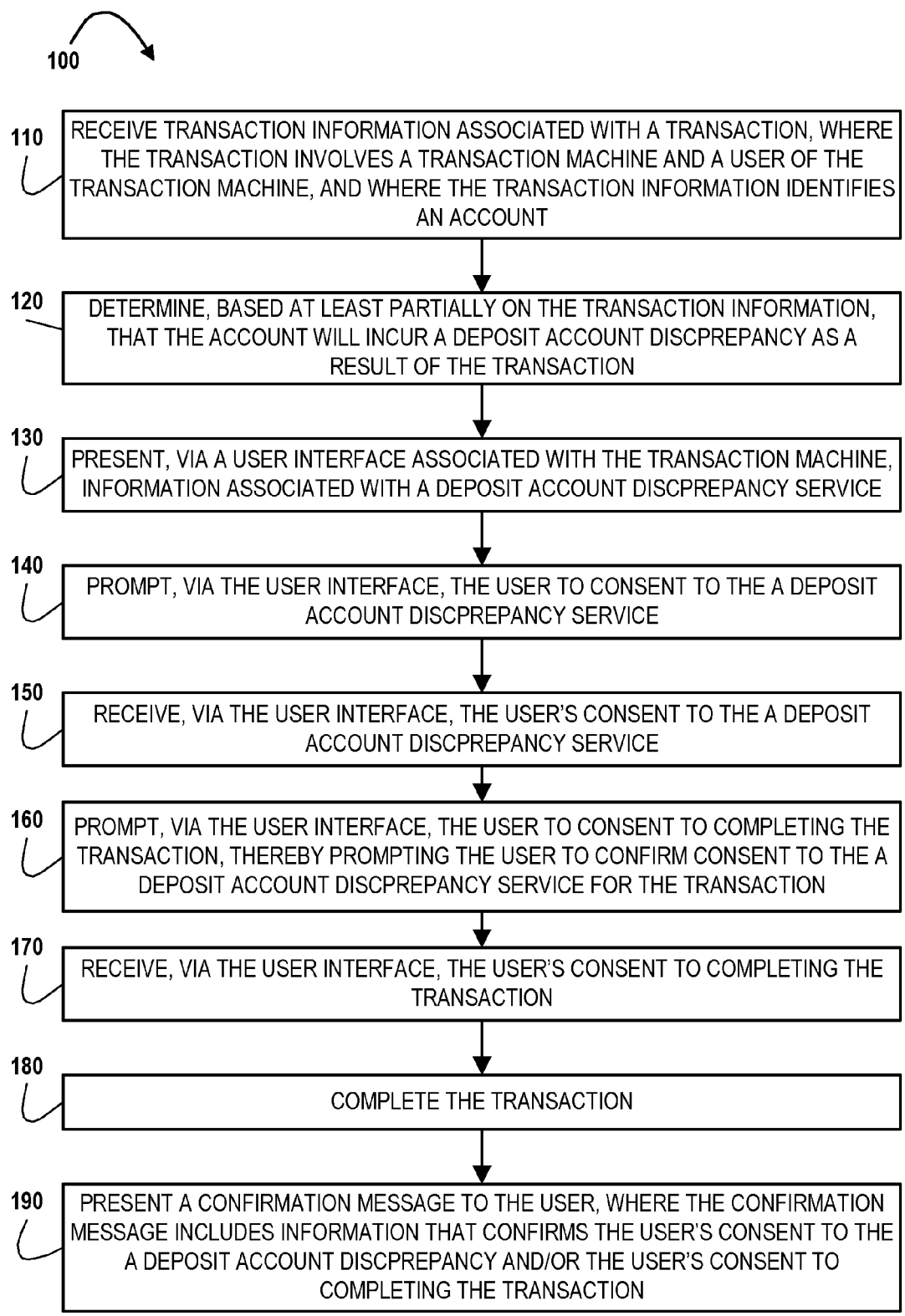
Figure 2:
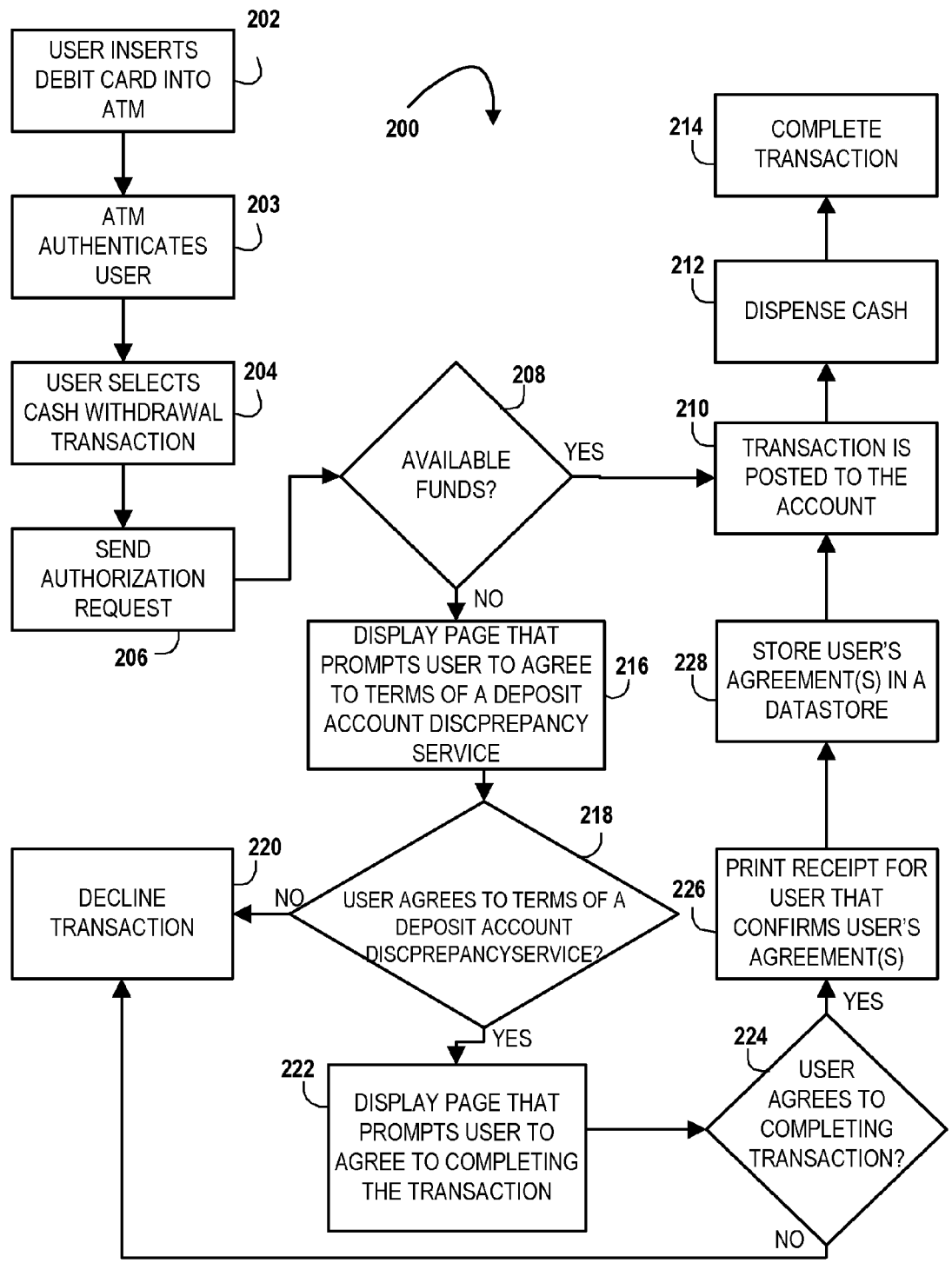
Figure 3:
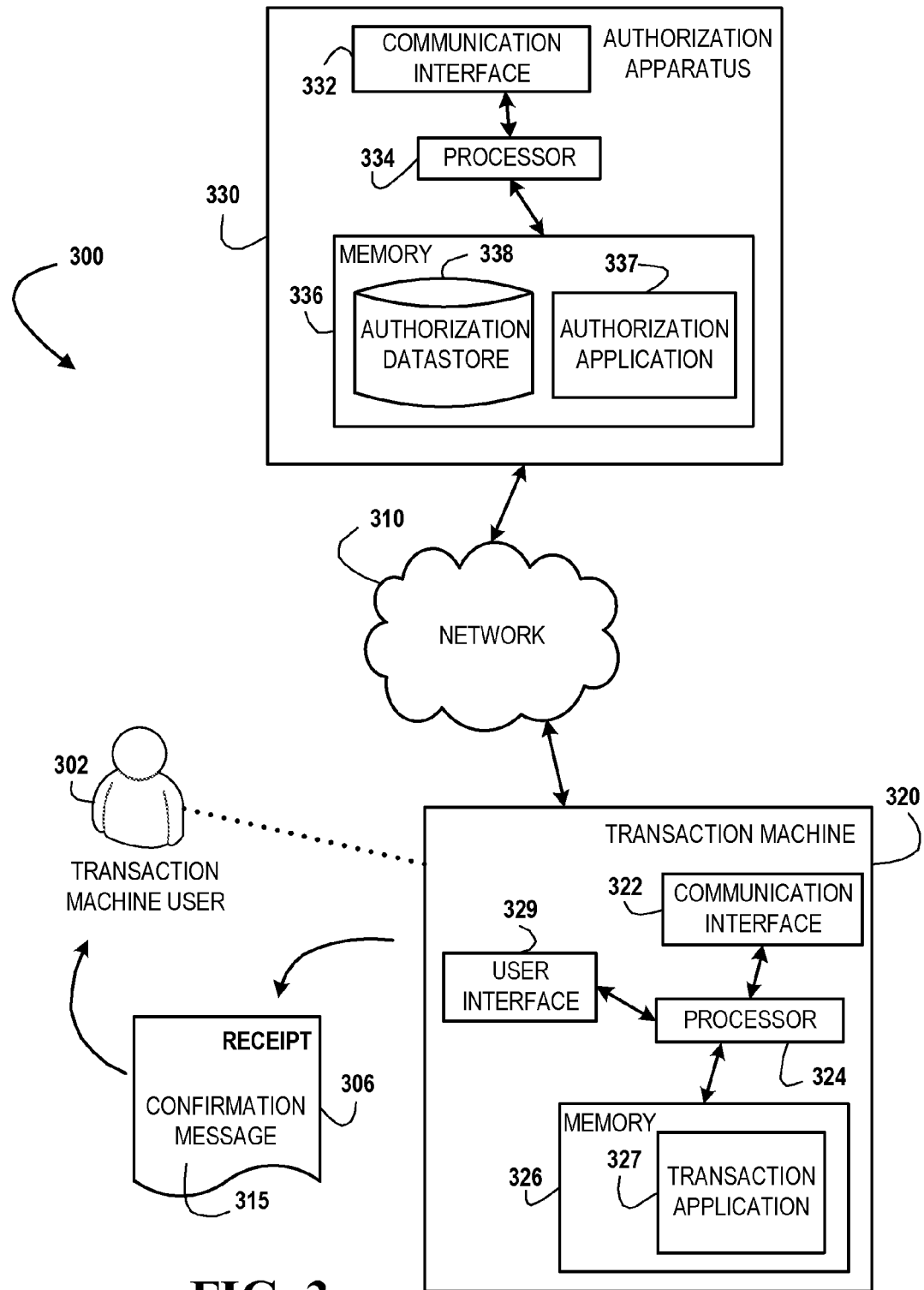
Figure 4:
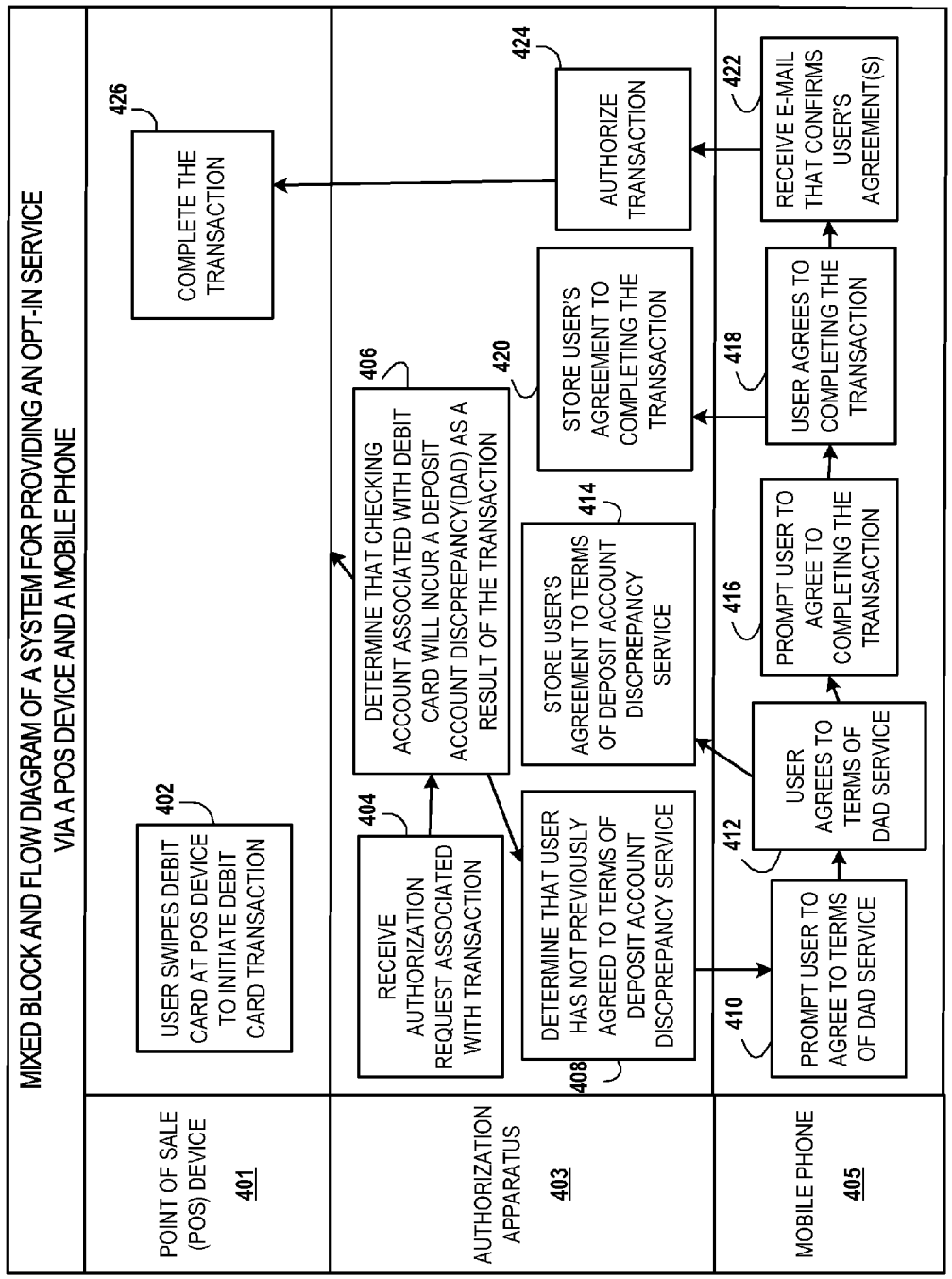
Figure 5:
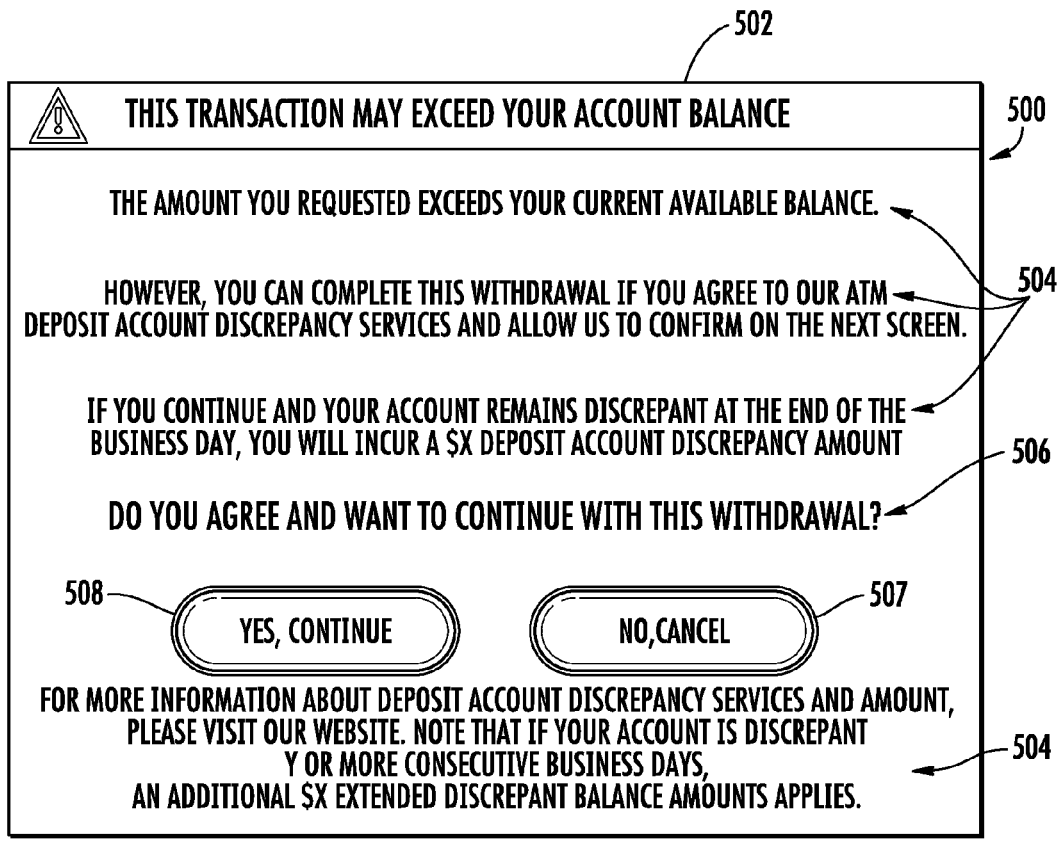
Figure 6:
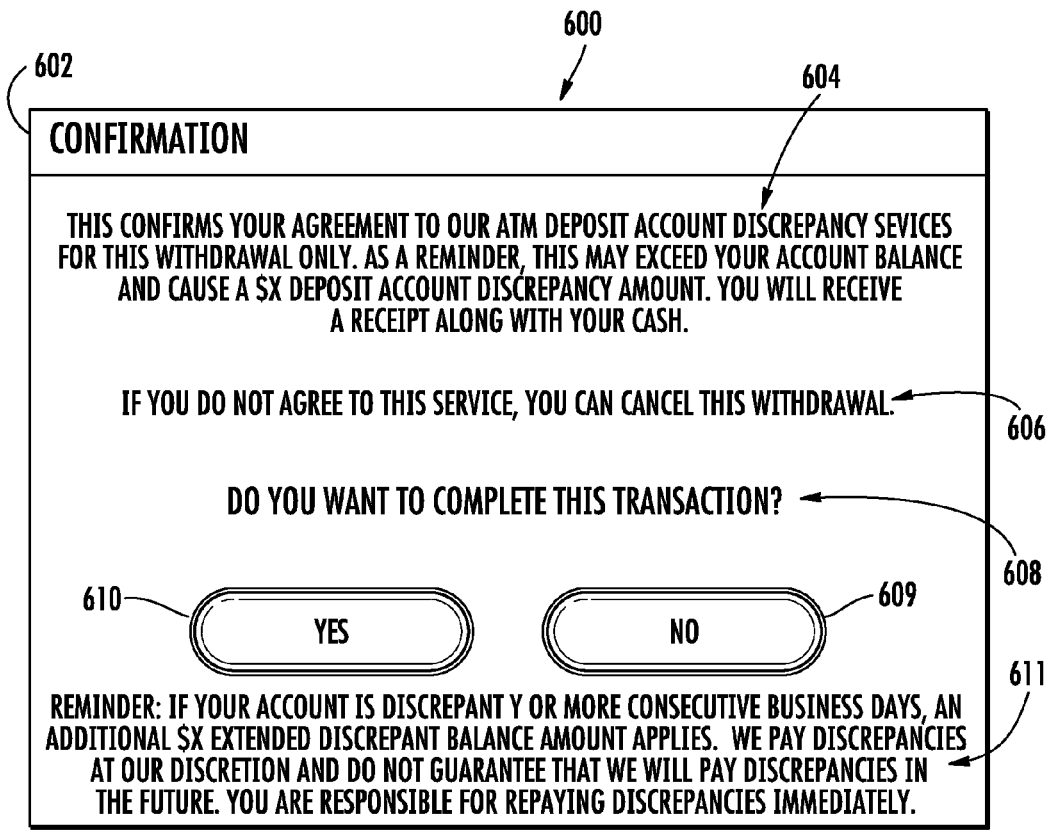
Figure 7:
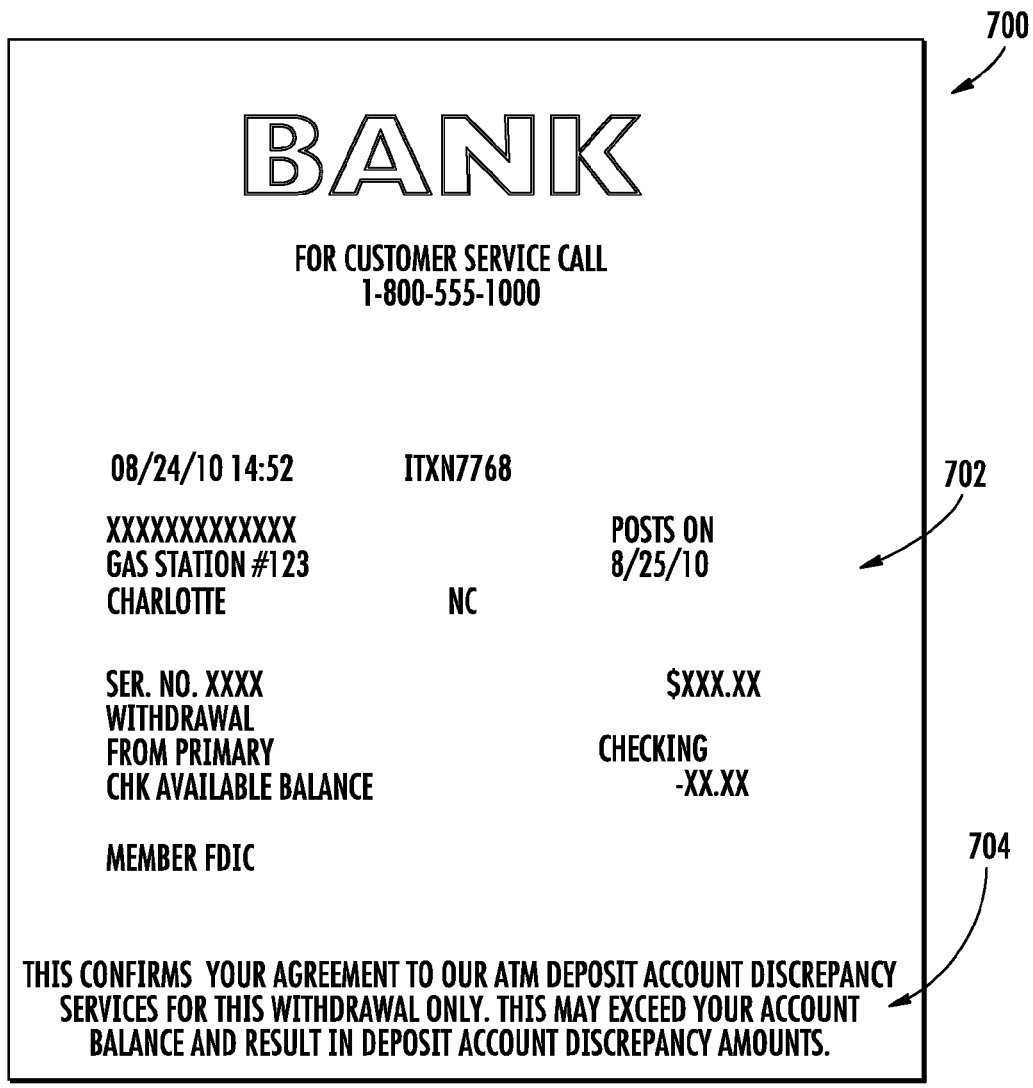

Having thus described some embodiments of the present invention in general terms, reference will now be made to the accompanying drawings, wherein:

FIG. 1 is a flow diagram illustrating a general process flow of an apparatus for providing a deposit account discrepancy service participation acknowledgement mechanism via a transaction machine, in accordance with an embodiment of the present invention;

FIG. 2 is a flow diagram illustrating a general process flow of an apparatus for providing a deposit account discrepancy service consent mechanism via an ATM, in accordance with an embodiment of the present invention;

FIG. 3 is a block diagram illustrating technical components of a system for providing a deposit account discrepancy service consent mechanism via a transaction machine, in accordance with an embodiment of the present invention;

FIG. 4 is a mixed block and flow diagram of a system for providing a deposit account discrepancy service consent mechanism via a POS device and a mobile phone, in accordance with an embodiment of the present invention;

FIG. 5 illustrates an exemplary display page of a touchscreen display associated with an ATM, in accordance with an embodiment of the present invention;

FIG. 6 illustrates another exemplary display page of a touchscreen display associated with an ATM, in accordance with an embodiment of the present invention; and FIG. 7 illustrates an exemplary receipt from an ATM cash withdrawal transaction, where the receipt includes a confirmation message, and where the confirmation message includes information that confirms a user's agreement to a deposit account discrepancy service, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, and/or operational aspects of any of the embodiments described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses and/or methods. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory and/or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

Referring now to FIG. 1, a general process flow 100 of an apparatus for providing a deposit account discrepancy service participation acknowledgement mechanism via a transaction machine is provided, in accordance with an embodiment of the present invention. As represented by block 110, the apparatus is configured to receive transaction information associated with a transaction, where the transaction involves a transaction machine and a user of the transaction machine, and where the transaction information identifies an account. As represented by block 120, the apparatus is also configured to determine, based at least partially on the transaction information, that the account will incur a deposit account discrepancy as a result of the transaction. In addition, as represented by block 130, the apparatus is configured to present, via a user interface associated with the transaction machine, information associated with the deposit account discrepancy, such as information associated with a deposit account discrepancy service. As represented by block 140, the apparatus is further configured to prompt, via the user interface, the user to consent to the deposit account discrepancy service. In addition, as represented by block 150, the apparatus is configured to receive, via the user interface, the user's consent to the deposit account discrepancy service. As represented by block 160, the apparatus is also configured to prompt, via the user interface, the user to consent to completing the transaction. Afterwards, the apparatus is configured to receive the user's consent to completing the transaction, as represented by block 170. The user's consent to completing the transaction also serves as confirmation that the user consents to use of the deposit account discrepancy service for the transaction. As represented by block 180, the apparatus is then configured to complete the transaction based on the user's consents. Further, as represented by block 190, the apparatus is configured to present, via the user interface, a confirmation message to the user, where the confirmation message includes information that confirms the user's consent to the deposit account discrepancy service and/or the user's consent to completing the transaction using the deposit account discrepancy service.

For simplicity, it will be understood that the portion of the process flow represented by block 120 is sometimes referred to herein as the "deposit account discrepancy determination." Also for simplicity, it will be understood that the phrase "deposit account discrepancy transaction" is sometimes used to refer to a transaction that, if completed, would cause the account to incur a deposit account discrepancy. In addition, it will be understood that, the term "determine," as used herein, is meant to have its ordinary meaning (i.e., its ordinary dictionary definition) in addition to the one or more ordinary meanings of the following terms: discover, learn, calculate, observe, read, decide, conclude, verify, ascertain, and/or the like.

It will also be understood that the apparatus having the process flow 100 illustrated in FIG. 1 can include one or more separate apparatuses (e.g., the transaction machine 320 and the authorization apparatus 330 described in FIG. 3). For example, in some embodiments, one apparatus (e.g., the transaction machine 320) is configured to perform the portions of the process flow 100 represented by blocks 130-170 and 190, and a second apparatus (e.g., the authorization apparatus 330) is configured to perform the portions represented by blocks 110, 120, and 180. As still another example, in some embodiments, a single apparatus (e.g., the authorization apparatus 330) is configured to perform each and every portion of the process flow 100. It will also be understood that, in some embodiments, a transaction machine (e.g., the transaction machine 320) is configured to perform one or more (or all) of the portions of the process flow 100, and that in some embodiments, that transaction machine is the transaction machine referred to in blocks 110 and 130.

Regarding block 110, the phrase "transaction machine," as used herein, typically refers to an interactive computer terminal that is configured to initiate, perform, complete, and/or facilitate one or more financial transactions. Examples of transaction machines include, but are not limited to, automated teller machines (ATMs), point of sale (POS) devices, self-service machines, public and/or business kiosks (e.g., an Internet kiosk, ticketing kiosk, telekiosk, donation kiosk, DVD vending kiosk, airline/train check-in kiosk, bill pay kiosk, etc.), vending machines, self-checkout machines (e.g., at a grocery store, retail store, etc.), mobile phones (e.g., feature phones, smart phones, etc.), gaming devices, computers (e.g., personal computers, tablet computers, laptop computers, etc.), personal digital assistants (PDAs), and/or the like.

It will be understood that, in some embodiments, the transaction machine is located in a public place and is available for public use (e.g., on a street corner, on the exterior wall of a banking center, at a public rest stop, etc.). In other embodiments, the transaction machine is additionally or alternatively located in a place of business and available for public and/or business customer use (e.g., in a post office, in a banking center, in a grocery store, etc.). It will also be understood that, in some embodiments, the transaction machine is not owned by the user of the transaction machine. However, in other embodiments, the transaction machine is located in a private place, is available for private use, and/or is owned by the user of the transaction machine.

It will also be understood that the transaction involving the user and the transaction machine can include any number and/or type of transaction(s) involving a transaction machine. For example, in some embodiments, the transaction includes one or more of the following: purchasing, renting, selling, and/or leasing goods and/or services (e.g., stamps, tickets (e.g., movie tickets, plane/train/bus tickets, concert tickets, sporting event tickets, etc.), gift certificates, DVDs, vending machine items, merchandise, groceries, etc.); withdrawing cash; making payments to creditors (e.g., paying monthly bills; paying federal, state, and/or local taxes and/or bills; etc.); sending remittances; transferring balances from one account to another account; loading money onto stored value cards; donating to charities; and/or the like.

It will also be understood that the account referred to in the process flow 100 typically refers to one or more deposit accounts. For example, in some embodiments, the account includes a checking account, savings account, money market account, investment account, brokerage account, certificate of deposit account, and/or the like. In some embodiments, the account is one or more accounts that can incur a deposit account discrepancy and/or be discrepant. Of course, it will be understood that embodiments of the present invention may also apply to one or more credit accounts, such as a credit card account or other line of credit (LOC) account, store credit account, and/or the like. Additionally or alternatively, in some embodiments, the account is one or more accounts that can incur an amount "discrepancy." For example, if a credit account has a $5,000 credit limit and a $5,300 account balance, then it will be understood that the credit account has incurred a credit account discrepancy amount of $300.

It will be understood that, in some embodiments, the account and the apparatus configured to perform the process flow 100 are controlled, serviced, managed, operated, and/or maintained (collectively referred to herein as "maintained" for simplicity) by a single financial institution. For example, in some embodiments, the apparatus is maintained by a bank, the account is maintained by the bank, and the user is a customer of the bank. Of course, it will be understood that, in some embodiments, the apparatus and the account are not maintained by the same financial institution (or any financial institution).

Regarding block 120, the term "deposit account discrepancy," as used herein, generally refers to the difference between: (a) the total amount of one or more purchases, draws, amounts, assess, balance transfers, debt obligations, and/or other liabilities incurred, or that will be incurred, by an account as a result of a transaction, and (b) the amount of funds available to the account immediately prior to the transaction. For example, if a checking account has an available balance of $25 immediately before the checking account is used to pay a $50 electric bill, then it will be understood that the checking account will incur a $25 deposit account discrepancy as a result of paying the bill. In some embodiments, the term "deposit account discrepancy" refers to the amount by which the balance of an account is negative. For example, if a debit account has an available balance of −$65, then it will be understood that the debit account has one or more deposit account discrepancies totaling $65.

Further regarding block 120, the apparatus configured to perform the process flow 100 can be configured to determine that the account will incur a deposit account discrepancy as a result of a present, initiated, and/or pending transaction (e.g., a transaction that has not yet occurred but will, etc.). For example, in some embodiments, the apparatus is configured to make the deposit account discrepancy determination based at least partially on a determination (e.g., by the apparatus performing the process flow 100, by another apparatus, etc.) that the transaction has been initiated (e.g., at a point of sale device or the like) and/or has been authorized (e.g., by the apparatus performing the process flow 100, by another apparatus, etc.), but has not yet been completed.

In addition to the above examples, it will also be understood that the apparatus configured to perform the process flow 100 can be configured to make the deposit account discrepancy determination in any way. For example, in some embodiments of the invention, the apparatus is configured to make the deposit account discrepancy determination by determining that the account does not have sufficient available funds to cover the transaction. Also, in some embodiments of the invention, the apparatus configured to perform the process flow 100 includes and/or is embodied as a financial transaction processing apparatus that is configured to process financial transactions involving the account and/or the transaction machine referred to in block 110. In some of these embodiments, the apparatus configured to perform the process flow 100 is configured to make deposit account discrepancy determinations for the account at the same time as, and/or nearly the same time as, the apparatus is processing transactions involving the account. Additionally or alternatively, in some embodiments, the apparatus configured to perform the process flow 100 includes and/or is embodied as an authorization apparatus configured to consider, authorize, and/or decline authorization requests and/or financial transactions. It will also be understood that the apparatus configured to perform the process flow 100 can be configured to make deposit account discrepancy determinations in real time and/or in substantially real time, such that the apparatus can determine a deposit account discrepancy immediately or nearly immediately after the deposit account discrepancy transaction has been initiated (e.g., upon the swipe of a debit card through a POS device, upon the user selecting an amount to withdraw from an ATM, etc.).

Regarding the user interface described in blocks 130-170 and 190, the user interface can include any type and/or number of user interface(s). In some embodiments, the user interface referred to in the process flow 100 includes and/or is embodied as the user interface 329 described in more detail herein below. Also, it will be understood that the user interface is accessible to the user of the transaction machine while the user is using the transaction machine. This means that, in some embodiments, the user interface is housed in the transaction machine and is operatively connected to the transaction machine. However, in other embodiments, the user interface is operatively connected to the transaction machine but is not housed in the transaction machine; instead, in such embodiments, the user interface located adjacent, near, and/or otherwise proximate to the transaction machine (e.g., a touchscreen display located within arm's reach of an ATM, etc.).

Also, in some embodiments, the user interface referred to in the process flow 100 is operatively connected to the apparatus having the process flow 100, but the user interface is not embodied as a component of the transaction machine referred to in the process flow 100. For example, in some embodiments, the apparatus having the process flow 100 is embodied as a server maintained by a financial institution, the transaction machine is embodied as a POS device maintained by a merchant, and the user interface is embodied as the touchscreen display of a mobile phone that is owned, possessed, controlled, and/or carried by the user during the transaction. In such embodiments, the server (i.e., the apparatus having the process flow 100) is configured to communicate with both the POS device and the mobile phone in order to perform the process flow 100. For example, in some embodiments, the server receives the transaction information from the POS device but sends the information associated with the deposit account discrepancy to the mobile phone so that the information can be presented to the user at the touchscreen display. As another example, in some embodiments of the invention, the server receives the user's consent to the deposit account discrepancy from the mobile phone carried by the user, and the server instructs the POS device to complete the transaction once the server receives the user's consent.

Regarding block 130, the information associated with the deposit account discrepancy service can include any type and/or amount of information. In some embodiments, the information associated with the deposit account discrepancy includes information about, describing, defining, and/or identifying the deposit account discrepancy referred to in block 120. For example, in some embodiments, the information notifies the user that the transaction, if completed, will result in the deposit account discrepancy and/or in one or more deposit account discrepancy amounts being assessed to the user and/or to the account. As another example, in some embodiments, the information associated with the deposit account discrepancy identifies the amount of the transaction, the available balance for the account, the amount of the deposit account discrepancy, the amount of the deposit account discrepancy amount(s) associated with incurring the deposit account discrepancy, and/or the like.

Regarding blocks 140-170, the apparatus having the process flow 100 can be configured to prompt the user and/or receive the user's consents in any way. For example, in some embodiments, where the user interface includes and/or is embodied as a touchscreen display, the apparatus is configured to cause the display to present an input feature (e.g., selectable button, link, etc.) on the display that invites the user to use the input feature to provide the user's consents. As another example, in some embodiments of the invention where the user interface includes a speaker, the apparatus having the process flow 100 is configured to cause the speaker to output one or more audible instructions that instruct the user to, for example, depress a physical button and/or speak into a microphone located on and/or near the transaction machine in order to provide the user's consents. The term "prompt" referred to in blocks 140 and 160 may include one or more questions, instructions, requests, messages, graphics, sounds, telephone calls, text messages, instant messages, voice messages, voice recordings, interactive voice response (IVR) communications, pages, emails, communications specific to one or more social media networks, and/or the like. In some embodiments, the apparatus having the process flow 100 is configured to communicate with the user of the transaction machine by using pre-recorded and/or dynamically generated video and/or audio (e.g., which may include one or more menu options, etc.) in order to further communicate with the user and/or direct the user how to proceed.

In some embodiments of the invention, the user must consent to the deposit account discrepancy service each time the user wishes to engage in a deposit account discrepancy transaction. Accordingly, in such embodiments, the user's consent to the deposit account discrepancy service is valid only for the deposit account discrepancy transaction referred to in the process flow 100 but is not valid for one or more future deposit account discrepancy transactions. The same may apply to the user's consent to completing the transaction using the deposit account discrepancy service; that is, in some embodiments, the user must consent to completing the transaction each time the user wishes to engage in a deposit account discrepancy transaction. In some embodiments of the invention where the user engages in multiple deposit account discrepancy transactions, the user need only consent to opting in to the deposit account discrepancy service once, but the user must consent to completing a transaction that may use the deposit account discrepancy service each time such a deposit account discrepancy transaction is attempted by the user. Of course, in some embodiments of the invention, the user may not need to consent to completing the transaction for each subsequent deposit account discrepancy transaction after consent is given once.

Regarding block 180, the apparatus configured to perform the process flow 100 can be configured to complete the transaction in any way. For example, in some embodiments, the apparatus is configured to send, to the transaction machine referred to in the process flow 100, one or more instructions to complete (and/or for completing) the transaction. However, in other embodiments, the apparatus having the process flow 100 is configured to complete the transaction itself. It will be understood that the phrase "complete the transaction," as used herein, may include authorizing an authorization request associated with the transaction, posting the transaction to the account, assessing a deposit account discrepancy amount to the account, storing the user's consent to the deposit account discrepancy in computer-readable memory, storing the user's consent to completing the transaction in computer-readable memory, printing a receipt associated with the transaction for the user, dispensing cash, approving a debit card transaction, and/or the like.

Regarding block 190, the confirmation message can be presented to the user in any way. In some embodiments, the confirmation message is presented to the user in an electronic form (e.g., as an email, text message, e-receipt, etc.), but in other embodiments, the confirmation message is presented to the user in written, tangible, and/or physical form (e.g., as a direct mailing, as a printed receipt, etc.). In addition, the confirmation message may be presented to the user before or after the transaction has been completed, as well as before or after the user leaves the transaction machine.

In some embodiments of the invention, the confirmation message is presented to the user via the user interface referred to in blocks 130-170. For example, where the user interface includes and/or is embodied as a touchscreen display (e.g., of an ATM, of a mobile phone, of a POS device, etc.), the apparatus having the process flow 100 is configured to present the confirmation message to the user as readable text on the touchscreen display. As another example, in some embodiments where the user interface includes and/or is embodied as a receipt printer, the apparatus is configured to present the confirmation message to the user by printing a receipt associated with the transaction that includes the confirmation message printed on the receipt. However, in other embodiments, the apparatus configured to perform the process flow 100 is configured to present the confirmation message to the user in other ways, such as, for example, by emailing the confirmation message to the user's email address, sending the confirmation message via a text message to the user's phone, mailing the confirmation message to the user's home address, sending an e-receipt having the confirmation message therein to an online banking account (e.g., online banking account, mobile banking account, SMS banking account, etc.) associated with the account and/or associated with (and/or accessible to) the user, and/or the like.

Further regarding block 190, the confirmation message includes information that confirms the user's consent to the deposit account discrepancy service and/or the user's consent to completing the transaction using the deposit account discrepancy service. As such, the confirmation message (and/or the information therein) indicates, validates, verifies, acknowledges, and/or confirms (e.g., to the user, to a financial institution, etc.) that the user has, in fact, consented to the deposit account discrepancy service and/or to completing the transaction using the deposit account discrepancy service. In some embodiments, the presentation of the confirmation message (and/or the information therein) to the user may make the user's consent(s) contractually and/or legally binding for purposes of one or more laws, rules, and/or regulations.

It will also be understood that the apparatus configured to perform the process flow 100 is configured to perform the portions of the process flow 100 represented by blocks 110-180 at some point after the user approaches the transaction machine for the transaction and before the user leaves the transaction machine. In some embodiments of the invention, this means that the apparatus is configured to perform the one or more portions of the process flow 100 (e.g., make the deposit account discrepancy determination, prompt the user to consent to the deposit account discrepancy, receive the user's consent to the deposit account discrepancy, etc.) during the transaction involving the transaction machine and the user. Additionally or alternatively, in some embodiments, the apparatus configured to perform the process flow 100 is configured to make the deposit account discrepancy determination in real time or near real time (collectively defined herein as "substantially real time" for simplicity), such that the apparatus is configured to make the deposit account discrepancy determination immediately or nearly immediately after the transaction has been initiated at the transaction machine.

It will further be understood that the apparatus configured to perform the process flow 100 can be configured to perform any of the portions of the process flow 100 represented by blocks 110-190 upon or after one or more triggering events (which, in some embodiments, is one or more of the other portions of the process flow 100). As used herein, a "triggering event" refers to an event that automatically (i.e., without human intervention) triggers the execution, performance, and/or implementation of a triggered action, either immediately, nearly immediately, or sometime after (e.g., within minutes, etc.) the occurrence of the triggering event. For example, in some embodiments, the apparatus configured to perform the process flow 100 is configured such that the apparatus making the deposit account discrepancy determination (the triggering event) automatically and immediately or nearly immediately triggers the apparatus to present the information associated with the deposit account discrepancy and/or to prompt the user to consent to the deposit account discrepancy (the triggered action(s)). In some embodiments, the apparatus is additionally or alternatively configured to automatically present the confirmation message to the user (triggered action) automatically and immediately or nearly immediately after completing the transaction (triggering event).

In accordance with some embodiments, the apparatus configured to perform the process flow 100 is configured to automatically perform one or more of the portions of the process flow 100 represented by blocks 110-190, whereas in other embodiments, one or more of the portions of the process flow 100 represented by blocks 110-190 require and/or involve human intervention (e.g., a user operating the apparatus configured to perform the process flow 100, etc.). In addition, it will be understood that, in some embodiments, the apparatus configured to perform the process flow 100 (and/or a user thereof) is configured to perform each portion of the process flow 100, from start to finish, within moments, seconds, and/or minutes (e.g., within approximately 1-15 minutes from start to finish, etc.). As an example, in some embodiments, the apparatus configured to perform the process flow 100 is configured to complete the transaction within moments, seconds, and/or minutes (e.g., within approximately 1-15 minutes, etc.) of: (a) receiving the transaction information associated with the transaction; and/or (b) determining that the account will incur a deposit account discrepancy as a result of the transaction. As another example, in some embodiments, the apparatus having the process flow 100 is configured to prompt the user to consent to the deposit account discrepancy service while the user is still at and/or near the transaction machine.

It will be understood that the number, order, and/or content of the portions of the process flow 100 are exemplary and may vary. For example, in some embodiments, the apparatus configured to perform the process flow 100 is configured to omit the portions of the process flow 100 represented by blocks 160 and 170 because, for example, the apparatus is configured to automatically complete the transaction immediately or nearly immediately after the apparatus receives the user's consent to the deposit account discrepancy service. As another example, in some embodiments, the apparatus configured to perform the process flow 100 is configured to present the confirmation message to the user, where the confirmation message includes information that confirms the user's consent to the deposit account discrepancy service, before prompting the user to consent to completing the transaction and/or before completing the transaction. Also, it will be understood that the apparatus configured to perform the process flow 100 can be configured to perform any one or more portions of any one or more embodiments described and/or contemplated herein, including, for example, any one or more portions of the process flows 200 and/or 400 described later herein.

It will also be understood that, in some embodiments, the apparatus configured to perform the process flow 100 is associated with a deposit account discrepancy service. For example, in some embodiments, the apparatus is configured to present the information associated with the deposit account discrepancy, as represented by block 130, by presenting information associated with a deposit account discrepancy service. As another example, in some embodiments, the apparatus having the process flow 100 is configured to prompt the user to consent to the deposit account discrepancy, as represented by block 140, by prompting the user to consent to, accept, and/or agree to (collectively referred to herein as "agree to" for simplicity) one or more terms of a deposit account discrepancy service. In some embodiments, the apparatus having the process flow 100 is configured to prompt the user to agree to the one or more terms of the deposit account discrepancy service by prompting the user to "opt into" and/or otherwise enroll in the deposit account discrepancy service. In some embodiments, as required by one or more laws, rules, and/or regulations, the user must opt into the deposit account discrepancy service before the user can participate in and/or otherwise use the deposit account discrepancy service. Additionally or alternatively, in some embodiments, the apparatus is configured to receive the user's consent to the deposit account discrepancy, as represented by block 150, by receiving the user's agreement to the one or more terms of the deposit account discrepancy service. Still further, in some embodiments, the apparatus is configured to present the confirmation message to the user, as represented by block 190, where the confirmation message includes information that confirms the user's agreement to the one or more terms of the deposit account discrepancy service (and/or the user's agreement to opt into and/or otherwise enroll in the deposit account discrepancy service).

As used herein, the phrase "deposit account discrepancy service" generally refers to a service that provides an account holder with the funds necessary to complete a deposit account discrepancy transaction. For example, in some embodiments, where a transaction, if completed, would deposit account discrepancy a checking account by $10, the deposit account discrepancy service can provide the checking account with the $10 needed to complete the transaction. As mentioned above, the deposit account discrepancy service includes one or more terms, which define the one or more rights, responsibilities, privileges, amounts, features, and/or obligations of the deposit account discrepancy service. For example, in some embodiments, the one or more terms of the deposit account discrepancy service describe how the deposit account discrepancy service works; identify the deposit account discrepancy service provider; define what constitutes a deposit account discrepancy; identify the one or more deposit account discrepancy amounts assessed for enrolling in the deposit account discrepancy service, for participating in the deposit account discrepancy service, and/or for engaging in a deposit account discrepancy transaction; and/or the like.

In some embodiments, the deposit account discrepancy service is provided by a financial institution, such as a bank. For example, in some embodiments, the deposit account discrepancy service is provided by the same financial institution that maintains the transaction machine, the apparatus configured to perform the process flow 100, and/or the account that incurs, or will incur, the deposit account discrepancy. It will be understood that, in some embodiments, the deposit account discrepancy service (and/or the deposit account discrepancy service provider) is regulated in the United States by the Electronic Funds Transfer Act, also known as Federal Reserve Board Regulation E (hereinafter "Regulation E"). Additionally or alternatively, in some embodiments, the deposit account discrepancy service does not contractually obligate the deposit account discrepancy service provider to cover deposit account discrepancies. In other words, in such embodiments, the deposit account discrepancy service provider may choose to cover discrepant items at its discretion. However, in other embodiments, the deposit account discrepancy service provider is contractually obligated to cover deposit account discrepancies incurred by an account (e.g., the account referred to in block 120, etc.).

It will further be understood that, in some embodiments, one or more portions of the process flow 100 may be configured to comply with one or more portions of a law, rule, and/or regulation that is directed to and/or otherwise relates to a deposit account discrepancy (collectively referred to herein as "deposit account discrepancy regulation" for simplicity). For example, in the United States, Regulation E regulates deposit account discrepancy services provided by financial institutions. Accordingly, it will be understood that some embodiments of the present invention enable a financial institution to comply with Regulation E and/or one or more other deposit account discrepancy regulations. For example, in some embodiments, presenting the information associated with the deposit account discrepancy (and/or a deposit account discrepancy service), as represented by block 130 in the process flow 100, may comply with one or more notification requirements of a deposit account discrepancy regulation. As another example, in some embodiments, receiving the user's consent to the deposit account discrepancy (and/or agreement to one or more terms of a deposit account discrepancy service), as represented by block 150, may comply with one or more consent requirements of a deposit account discrepancy regulation. As still another example, in some embodiments, prompting the user to consent to completing the transaction, as represented by block 160, may comply with one or more revocation requirements of a deposit account discrepancy regulation (e.g., where the user must be given the opportunity to revoke his or her consent to the deposit account discrepancy, etc.). As a further example, in some embodiments, receiving the user's consent to completing the transaction, as represented by block 170, may comply with one or more confirmation requirements of a deposit account discrepancy regulation. As another example, in some embodiments where presenting the confirmation message to the user includes printing a receipt for the user, printing the receipt may comply with one or more written requirements of a deposit account discrepancy regulation.

In some alternative embodiments of the present invention, the process flow 100 includes one or more additional and/or alternative portions, and/or the apparatus configured to perform the process flow 100 is configured to perform one or more additional or alternative functions. For example, in some embodiments, the apparatus configured to perform the process flow 100 is configured to assess a deposit account discrepancy amount to the account and/or to the user, where the deposit account discrepancy amount is based at least partially on the account incurring a deposit account discrepancy, where the deposit account discrepancy amount is based at least partially on the amount of the deposit account discrepancy, and/or where the deposit account discrepancy amount is assessed after completing the transaction. As another example, in some embodiments, the apparatus configured to perform the process flow 100 is configured to determine whether the user has consented to a deposit account discrepancy and/or agreed to one or more terms of a deposit account discrepancy service. As still another example, in some embodiments, the apparatus configured to perform the process flow 100 is configured to store (e.g., in a data store, in an online banking account, etc.) the user's consent to the deposit account discrepancy and/or the user's consent to completing the transaction, which may, in some embodiments, be required by one or more government and/or financial institution regulations (and/or one or more deposit account discrepancy regulations). As a further example, in some embodiments, the apparatus configured to perform the process flow 100 is configured to authenticate (i.e., confirm the identity of) the user of the transaction machine and only accept the user's consent to the deposit account discrepancy service if the user's identity is authenticated. In some embodiments, the apparatus is configured to authenticate the user of the transaction machine based at least partially on one or more credentials (e.g., ATM/debit/credit card, username, password, PIN, biometric information, etc.) the user inserts, provides, and/or presents (collectively referred to herein as "presents" for simplicity) to the transaction machine and/or to the apparatus having the process flow 100.

As a further example of an additional or alternative portion, in some embodiments, the apparatus configured to perform the process flow 100 is configured to generate and/or send disclosure information to the user (i.e., in addition to any disclosure information referred to in the process flow 100) before the deposit account discrepancy transaction is initiated, before the user approaches the transaction machine, prior to the apparatus receiving the transaction information, prior to the apparatus receiving the user's consent to the deposit account discrepancy (and/or agreement to one or more terms of a deposit account discrepancy service), and/or prior to the apparatus receiving the user's consent to completing the transaction. For example, in some embodiments, prior to the apparatus receiving the transaction information, the apparatus configured to perform the process flow 100 is configured to generate and/or send disclosure information to the user that defines one or more terms of a deposit account discrepancy service. It will also be understood that this disclosure information can be sent via one or more notifications that can include and/or be embodied as one or more emails, telephone calls, text messages, instant messages, IVR communications, communications specific to one or more social media networks, direct mailings, online banking account messages, and/or the like. Also, in some embodiments, the disclosure information is included in one or more notifications typically sent to a user, such as, for example, a monthly account statement.

In some embodiments, the sending the disclosure information to the user may help a financial institution comply with one or more requirements of a deposit account discrepancy regulation. For example, in some embodiments, the disclosure information includes information similar or identical to the information shown in the A-9 Model Consent Form for Deposit account discrepancy Services, which is provided by the Federal Reserve at http://www.federalreserve.gov/DCCA/RegulationE/20081218/A-9.pdf and is incorporated herein by reference in its entirety. As such, prompting the user to consent to the deposit account discrepancy service, as represented by block 140, can include prompting the user to agree, electronically sign, and/or otherwise acknowledge, via the user interface, that: (a) the user has received the disclosure information; (b) the user understands the one or more terms of the deposit account discrepancy service defined in the disclosure information; and/or (c) the user agrees to the one or more terms of the deposit account discrepancy service defined in the disclosure information. Similarly, the receiving the user's consent to the deposit account discrepancy, as represented by block 150, can include receiving one or more of the user's agreements, signatures, and/or other acknowledgements in response to one or more of the above prompts. In some embodiments, because the user is sent the disclosure information and prompted as described above, the prompting the user to consent to the deposit account discrepancy (and/or to agree to the one or more terms of the deposit account discrepancy service) and/or the receiving the user's consent to the deposit account discrepancy (and/or the receiving the user's agreement to the one or more terms of the deposit account discrepancy service) may, individually or collectively, comply with one or more requirements of Regulation E and/or of one or more other deposit account discrepancy regulations.

Furthermore, in some embodiments of the invention, the apparatus includes a memory device that has information stored therein about whether the user has been mailed or otherwise sent deposit account discrepancy service disclosure materials prior to the current transaction. In some such embodiments of the invention, the apparatus may condition offering the deposit account discrepancy service to the user based on there being an indication in the memory device that the user has already received the disclosure materials.

Referring now to FIG. 2, a general process flow 200 of an apparatus for providing a deposit account discrepancy service consent mechanism via an ATM is provided, in accordance with an embodiment of the present invention. It will be understood that the process flow 200 illustrated in FIG. 2 represents an example embodiment of the process flow 100 described in connection with FIG. 1. The apparatus having the process flow 200 is operatively connected to, includes, and/or is embodied as the ATM referred to in the process flow 200. In accordance with some embodiments, the ATM referred to in the process flow 200 is maintained by a financial institution for the benefit of its customers. Also in accordance with some embodiments, the user referred to in the process flow 200 is the user of the ATM and a customer of the financial institution. In addition, the account referred to in the process flow 200 is a checking account held by the user and maintained by the financial institution.

As represented by block 202, the user inserts a debit card associated with the checking account into the ATM. Thereafter, as represented by block 203, the ATM (and/or the apparatus having the process flow 200) authenticates the user. In some embodiments, the ATM authenticates the user based at least partially on one or more credentials the user presents to the ATM. Also, as represented by block 204, the user selects a cash withdrawal transaction, which, in some embodiments, includes the user selecting a specific cash amount for withdrawal. Then, as represented by block 206, the ATM sends an authorization request to the apparatus having the process flow 200, where the authorization request identifies and/or describes the cash withdrawal transaction, the user, the checking account, and/or the like. Upon receiving the authorization request, the apparatus having the process flow 200 must determine whether the checking account associated with the debit card has sufficient available funds to cover the cash withdrawal transaction, as represented by block 208. If so, then the apparatus, as represented by blocks 210-214, posts the cash withdrawal transaction to the checking account (e.g., posts the transaction to an online banking account associated with the checking account, etc.), dispenses the cash to the user, and otherwise completes the transaction (e.g., prints a receipt for the user that memorializes the cash withdrawal transaction, etc.).

However, if the apparatus having the process flow 200 determines that the checking account does not have sufficient available funds to cover the cash withdrawal transaction, then the apparatus is configured to display, on a touchscreen display of the ATM, a page that prompts the user to agree to one or more terms of a deposit account discrepancy service, as represented by block 216. Thereafter, the apparatus having the process flow 200 determines whether the user agrees to the one or more terms of the deposit account discrepancy service (and/or whether the user agrees to opt into the deposit account discrepancy service), as represented by block 218. If the user indicates, via the display, that he or she does not agree to the one or more terms of the deposit account discrepancy service, then the apparatus is configured to decline (and/or cancel, abort, reject, etc.) the transaction, as represented by block 220. However, if the user does agree to the one or more terms of the deposit account discrepancy service via the ATM display, then the apparatus having the process flow 200 displays a page, on the display, that prompts the user to agree to completing the cash withdrawal transaction, as represented by block 222.

After prompting the user, the apparatus having the process flow 200 determines whether the user agrees to completing the transaction using the deposit account discrepancy service, as represented by block 224. If the user indicates, via the display, that he or she does not want to complete the transaction, then the apparatus is configured to decline (and/or cancel, abort, reject, etc.) the transaction, as represented by block 220. However, if the user does agree, via the ATM display, to completing the transaction, then the apparatus having the process flow 200 prints a receipt for the user that confirms the user's agreement to the one or more terms of the deposit account discrepancy service and/or the user's agreement to completing the transaction, as represented by block 226. In addition, as represented by block 228, the apparatus having the process flow 200 stores, in a datastore (e.g., computer-readable memory, etc.), the user's agreement to the one or more terms of the deposit account discrepancy service and/or the user's agreement to completing the transaction. In some embodiments, the apparatus additionally or alternatively posts the user's agreement(s), and/or the one or more terms of the deposit account discrepancy service, to an online banking account associated with the checking account, accessible to the user, and/or maintained by a financial institution (e.g., the financial institution that maintains the checking account, etc.). After receiving the user's agreement to completing the transaction, the apparatus having the process flow 200 posts the cash withdrawal transaction to the user's checking account, dispenses cash in accordance with the cash withdrawal transaction, and otherwise completes the transaction, as represented by blocks 210-214.

It will be understood that, in accordance with some embodiments, one or more portions of the process flow 200 may comply with one or more requirements of a deposit account discrepancy regulation (e.g., Regulation E in the United States, etc.). For example, in some embodiments, receiving the user's agreement to the one or more terms of the deposit account discrepancy service, as represented by the "Yes" arrow between blocks 218 and 222, and/or receiving the user's agreement to completing the transaction, as represented by the "Yes" arrow between blocks 224 and 226, may comply with one or more requirements of a deposit account discrepancy regulation. In addition, in some embodiments, receiving the user's agreement(s) may comply with one or more deposit account discrepancy regulation requirements because, for example, the user was first authenticated by the ATM and/or by the apparatus having the process flow 200. Additionally, as another example, in some embodiments, printing the receipt for the user that confirms the user's agreement(s), as represented by block 226, and/or storing the user's agreement(s) in a datastore, as represented by block 228, may comply with one or more deposit account discrepancy regulation requirements.

Of course, it will also be understood that the embodiment illustrated in FIG. 2 is merely exemplary and that other embodiments may vary without departing from the scope and spirit of the present invention. In addition, it will also be understood that the apparatus having the process flow 200 can be configured to perform one or more portions of the process flow 200 in real time, in substantially real time, and/or at one or more predetermined times. The apparatus having the process flow 200 may be configured to perform any of the portions of the process flow 200 represented by blocks 202-228 upon or after one or more triggering events (which, in some embodiments, is the performance of one or more of the other portions of the process flow 200). In addition, in some embodiments, the apparatus having the process flow 200 (and/or a user thereof) is configured to perform each portion of the process flow 200, from start to finish, within moments, seconds, and/or minutes (e.g., within approximately 1-15 minutes, etc.).

Referring now to FIG. 3, a system 300 for providing a deposit account discrepancy service consent mechanism via a transaction machine is provided, in accordance with an embodiment of the present invention. As illustrated, the system 300 includes a network 310, a transaction machine 320, and an authorization apparatus 330. FIG. 3 also shows a user 302 of the transaction machine 320 and a receipt 306, which includes a confirmation message 315. It will be understood that the user 302 has access to and uses the transaction machine 320. It will also be understood that FIG. 3 depicts the user 302 receiving the receipt 306 from the transaction machine 320.

In some embodiments, the transaction machine 320 and the authorization apparatus 330 are each maintained by the same financial institution. For example, in some embodiments, the transaction machine user 302 is a customer of the financial institution, the authorization apparatus 330 is embodied as an ATM transaction server maintained by the financial institution, and the transaction machine 320 is embodied as an ATM maintained by the financial institution. However, in other embodiments, the transaction machine 320 and the authorization apparatus 330 are maintained by separate entities. For example, in some embodiments, the transaction machine 320 is maintained by a merchant, and the authorization apparatus 330 is maintained by a financial institution.

As shown in FIG. 3, the transaction machine 320 and the authorization apparatus 330 are each operatively and selectively connected to the network 310, which may include one or more separate networks. In addition, the network 310 may include one or more interbank networks, telephone networks, telecommunication networks, local area networks (LANs), wide area networks (WANs), and/or global area networks (GANs) (e.g., the Internet, etc.). It will also be understood that the network 310 may be secure and/or unsecure and may also include wireless and/or wireline technology.

The transaction machine 320 may include any computerized apparatus that can be configured to perform any one or more of the functions of the transaction machine 320 described and/or contemplated herein. It will also be understood that the transaction machine 320 can include and/or be embodied as, any transaction machine described and/or contemplated herein. It will further be understood that the transaction machine 320 can initiate, perform, complete, and/or otherwise facilitate any transaction described and/or contemplated herein as being initiated, performed, and/or otherwise facilitated by a transaction machine. For example, in some embodiments, the transaction machine 320 includes and/or is embodied as an ATM, a POS device, a ticketing kiosk, a self-checkout machine, a vending machine, a personal computer, a mobile phone, and/or the like. As another example, in some embodiments, the transaction machine 320 is configured to initiate, perform, complete, and/or otherwise facilitate one or more financial and/or non-financial transactions, including, for example, purchasing, renting, selling, and/or leasing goods and/or services (e.g., groceries, stamps, tickets, gift certificates, DVDs, etc.); withdrawing cash; making deposits (e.g., cash, checks, etc.); making payments (e.g., paying telephone bills, sending remittances, etc.); accessing the Internet; and/or the like.

In some embodiments, the transaction machine 320 (and/or one or more other portions of the system 300) requires its users to authenticate themselves to the transaction machine 320 before the transaction machine 320 (and/or one or more other portions of the system 300) will initiate, perform, complete, and/or facilitate a transaction. For example, in some embodiments, the transaction machine 320 (and/or one or more applications executing on the transaction machine 320 (e.g., the transaction application 327, etc.)) is configured to authenticate a transaction machine user based at least partially on an ATM/debit/credit card, loyalty/rewards/club card, smart card, token (e.g., USB token, etc.), username/password, personal identification number (PIN), biometric information, and/or one or more other credentials that the user presents to the transaction machine 320. Additionally or alternatively, in some embodiments, the transaction machine 320 is configured to authenticate a user by using one-, two-, or multi-factor authentication. For example, in some embodiments, the transaction machine 320 requires two-factor authentication, such that the transaction machine user 302 must provide a valid debit card and enter the correct PIN associated with the debit card in order to authenticate the user 302 to the transaction machine 320.

As illustrated in FIG. 3, in accordance with some embodiments of the present invention, the transaction machine 320 includes a communication interface 322, a processor 324, a memory 326 having a transaction application 327 stored therein, and a user interface 329. In such embodiments, the processor 324 is operatively and selectively connected to the communication interface 322, the user interface 329, and the memory 326.

Each communication interface described herein, including the communication interface 322, generally includes hardware, and, in some instances, software, that enables a portion of the system 300, such as the transaction machine 320, to send, receive, and/or otherwise communicate information to and/or from the communication interface of one or more other portions of the system 300. For example, the communication interface 322 of the transaction machine 320 may include a modem, network interface controller (NIC), network adapter, network interface card, and/or some other electronic communication device that operatively connects the transaction machine 320 to another portion of the system 300, such as, for example, the authorization apparatus 330.

Each processor described herein, including the processor 324, generally includes circuitry for implementing the audio, visual, and/or logic functions of that portion of the system 300. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the transaction application 327 of the memory 326 of the transaction machine 320.

Each memory device described herein, including the memory 326 for storing the transaction application 327 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 3, the memory 326 includes the transaction application 327. It will be understood that the transaction application 327 can be operable to initiate, perform, complete, and/or facilitate one or more portions of one or more of the embodiments described and/or contemplated herein, such as, for example, one or more portions of the process flows 100, 200, and/or 400 described herein. For example, in some embodiments, the transaction application 327 is operable to present, to the transaction machine user 302 at the user interface 329, information associated with a deposit account discrepancy. As another example, in some embodiments, the transaction application 327 is operable to prompt, via the user interface 329, the user 302 to consent to a deposit account discrepancy, which may include prompting the user to agree to one or more terms of a deposit account discrepancy service (and/or to opt into the deposit account discrepancy service). In some embodiments, the transaction application 327 is operable to prompt, via the user interface 329, the user to consent and/or agree to completing a transaction.

As still another example, in some embodiments, the transaction application 327 is operable to receive transaction information associated with a transaction, receive the user's 302 consent to a deposit account discrepancy, and/or receive the user's 302 consent to completing a transaction. As a further example, in some embodiments, the transaction application 327 is operable to present, via the user interface 329, a confirmation message to the user 302. In some of these embodiments, the confirmation message confirms the user's consent to a deposit account discrepancy and/or the user's consent to completing the transaction. Additionally or alternatively, in some embodiments, the transaction application 327 is operable to present a confirmation message to the user 302 by printing the receipt 306 for the user 302, where the receipt 306 includes the confirmation message 315 printed thereon. In some embodiments, the confirmation message 315 includes the confirmation message 604 shown in FIG. 6 and/or the confirmation message 704 shown in FIG. 7. Also, it will be understood that, in some embodiments, the transaction application 327 is operable to perform one or functions, such that a financial institution may comply with one or more requirements of a deposit account discrepancy regulation (e.g., Regulation E in the United States, etc.).

In some embodiments, where the transaction machine 320 includes and/or is embodied as an ATM, the transaction application 327 is configured to execute on the ATM in order to initiate, perform, complete, and/or facilitate, for example, one or more cash withdrawals, deposits, and/or the like. In other embodiments, where the transaction machine 320 includes and/or is embodied as a POS device, the transaction application 327 is configured to execute on the POS device in order to initiate, perform, complete, and/or facilitate, for example, one or more debit card transactions. In still other embodiments, where the transaction machine 320 includes and/or is embodied as a personal computer, the transaction application 327 is configured to execute on the personal computer, and, in some embodiments, the transaction application 327 is embodied as a web browser (i.e., for navigating the Internet, etc.) that is operable to initiate, perform, complete, and/or otherwise facilitate one or more financial and/or non-financial transactions.

In some embodiments, the transaction application 327 is operable to enable the transaction machine user 302 and/or transaction machine 320 to communicate with one or more other portions of the system 300, and/or vice versa. In some embodiments, the transaction application 327 is additionally or alternatively operable to initiate, perform, complete, and/or otherwise facilitate one or more financial and/or non-financial transactions. In some embodiments, the transaction application 327 includes one or more computer-executable program code portions for causing and/or instructing the processor 324 to perform one or more of the functions of the transaction application 327 and/or transaction machine 320 described and/or contemplated herein. In some embodiments, the transaction application 327 includes and/or uses one or more network and/or system communication protocols.

As shown in FIG. 3, the transaction machine 320 also includes the user interface 329. It will be understood that the user interface 329 can include and/or be embodied as one or more user interfaces. It will also be understood that, in some embodiments, the user interface 329 includes one or more user output devices for presenting information and/or one or more items to the transaction machine user 302, such as, for example, one or more displays, speakers, receipt printers, dispensers (e.g., cash dispensers, ticket dispensers, merchandise dispensers, etc.), and/or the like. In some embodiments, the user interface 329 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, card readers (e.g., for reading the magnetic strip on magnetic cards such as ATM, debit, credit, and/or bank cards, etc.), deposit mechanisms (e.g., for depositing checks and/or cash, etc.), and/or the like for receiving information from one or more items and/or from the transaction machine user 302. In some embodiments, the user interface 329 and/or the transaction machine 320 includes one or more vaults, security sensors, locks, and/or anything else typically included in and/or near the transaction machine.

FIG. 3 also illustrates an authorization apparatus 330, in accordance with an embodiment of the present invention. The authorization apparatus 330 may include any computerized apparatus that can be configured to perform any one or more of the functions of the authorization apparatus 330 described and/or contemplated herein. It will also be understood that the authorization apparatus 330 can include and/or be embodied as any authorization apparatus described and/or contemplated herein. It will further be understood that the authorization apparatus 330 can initiate, perform, complete, and/or otherwise facilitate any transaction described and/or contemplated herein as being initiated, performed, and/or otherwise facilitated by an authorization apparatus. In some embodiments, the authorization apparatus 330 includes and/or is embodied as one or more servers, engines, mainframes, personal computers, ATMs, network devices, front end systems, back end systems, and/or the like. In some embodiments, such as the one illustrated in FIG. 3, the authorization apparatus 330 includes a communication interface 332, a processor 334, and a memory 336, which includes an authorization application 337 and an authorization datastore 338 stored therein. As shown, the communication interface 332 is operatively and selectively connected to the processor 334, which is operatively and selectively connected to the memory 336.

The authorization application 337 can be operable to initiate, perform, complete, and/or facilitate any one or more portions of one or more of the embodiments described and/or contemplated herein, such as, for example, any one or more portions of the process flows 100, 200, and/or 400 described herein. For example, in some embodiments, the authorization application 337 is operable to prompt, via the user interface 329, the user 302 to consent to a deposit account discrepancy (and/or to one or more terms of a deposit account discrepancy service) and/or to consent to completing a transaction. As another example, in some embodiments, the authorization application 337 is operable to receive transaction information associated with a transaction, receive the user's 302 consent to one or more deposit account discrepancies (and/or to one or more terms of a deposit account discrepancy service), and/or receive the user's 302 consent to completing a transaction. As another example, in some embodiments, the authorization application 337 is operable to determine, based at least partially on transaction information, that an account will incur a deposit account discrepancy as a result of a transaction. As still another example, in some embodiments, the authorization application 337 is operable to complete a transaction. As a further example, in some embodiments, the authorization application 337 is operable to present, via the user interface 329 of the transaction machine 320, information associated with a deposit account discrepancy and/or a confirmation message to the user 302 of the transaction machine 320.

As another example, in some embodiments, the authorization application 337 is operable to generate and/or send disclosure information to the user 302, where the disclosure information defines one or more terms of a deposit account discrepancy service. In some embodiments, the authorization application 337 generates and/or sends this disclosure information to the user 302 prior to the user 302 initiating a transaction at the transaction machine 320. Also, in some embodiments, the authorization application 337 is further operable to prompt (e.g., via the user interface 329, etc.) the user 302 to agree to the one or more terms of the deposit account discrepancy service defined in the disclosure information. In some embodiments, the authorization application 337 is operable to perform one or more of these (and/or other) functions, such that a financial institution may comply with one or more deposit account discrepancy regulation requirements (e.g., Regulation E in the United States, etc.).

In some embodiments, the authorization application 337 is operable to enable the authorization apparatus 330 to communicate with one or more other portions of the system 300, such as, for example, the authorization datastore 338 and/or the transaction machine 320, and/or vice versa. In addition, in some embodiments, the authorization application 337 is operable to initiate, perform, complete, and/or otherwise facilitate one or more financial and/or non-financial transactions. In some embodiments, the authorization application 337 includes one or more computer-executable program code portions for causing and/or instructing the processor 334 to perform one or more of the functions of the authorization application 337 and/or the authorization apparatus 330 that are described and/or contemplated herein. In some embodiments, the authorization application 337 includes and/or uses one or more network and/or system communication protocols.

In addition to the authorization application 337, the memory 336 also includes the authorization datastore 338. It will be understood that the authorization datastore 338 can be configured to store any type and/or amount of information. For example, in some embodiments, the authorization datastore 338 includes information associated with one or more transaction machines, transaction machine users, transactions, deposit account discrepancies, financial accounts, deposit account discrepancy services, authorization requests, deposit account discrepancy regulations, and/or the like. In some embodiments, the authorization datastore 338 may also store any information related to providing a deposit account discrepancy service consent mechanism via a transaction machine. In some embodiments, the authorization datastore 338 additionally or alternatively stores information associated with online banking and/or online banking accounts.

It will be understood that the authorization datastore 338 may include any one or more storage devices, including, but not limited to, datastores, databases, and/or any of the other storage devices typically associated with a computer system. It will also be understood that the authorization datastore 338 may store information in any known way, such as, for example, by using one or more computer codes and/or languages, alphanumeric character strings, data sets, figures, tables, charts, links, documents, and/or the like. Further, in some embodiments, the authorization datastore 338 includes information associated with one or more applications, such as, for example, the authorization application 337 and/or the transaction application 327. In some embodiments, the authorization datastore 338 provides a real-time or near real-time representation of the information stored therein, so that, for example, when the processor 334 accesses the authorization datastore 338, the information stored therein is current or nearly current.

Of course, it will be understood that the embodiment illustrated in FIG. 3 is exemplary and other embodiments may vary. For example, in some embodiments, some or all of the portions of the system 300 are combined into a single portion. Specifically, in some embodiments, the transaction machine 320 and the authorization apparatus 330 are combined into a single transaction and authorization apparatus that is configured to perform all of the same functions of those separate portions as described and/or contemplated herein. Likewise, in some embodiments, some or all of the portions of the system 300 are separated into two or more distinct portions. In addition, the various portions of the system 300 may be maintained by the same or separate parties. For example, in some embodiments, where the transaction machine 320 includes and/or is embodied as an ATM and where the authorization apparatus 330 includes and/or is embodied as an ATM transaction server, a single bank may maintain the ATM and the ATM transaction server. However, in other embodiments, the authorization apparatus 330 and the transaction machine 320 are maintained by separate entities.

It will also be understood that the system 300 (and/or one or more portions of the system 300) may include and/or implement any embodiment of the present invention described and/or contemplated herein. For example, in some embodiments, the system 300 (and/or one or more portions of the system 300) is configured to implement any one or more embodiments of the process flow 100 described and/or contemplated herein in connection with FIG. 1, any one or more embodiments of the process flow 200 described and/or contemplated herein in connection with FIG. 2, any one or more embodiments of the process flow described and/or contemplated herein in connection with FIG. 4, and/or any one or more of the embodiments of the present invention as described and/or contemplated herein in connection with FIGS. 5, 6, and/or 7.

As a specific example, in accordance with an embodiment of the present invention, (1) the authorization apparatus 330 receives transaction information associated with a transaction, where the transaction involves the transaction machine 320 and the user 302, and where the transaction information identifies an account (e.g., an account stored in the authorization datastore 338, etc.), as represented by block 110 in FIG. 1; (2) the authorization apparatus 330 makes the deposit account discrepancy determination based at least partially on the transaction information, as represented by block 120; (3) the transaction machine 320 presents, via the user interface 329, information associated with the deposit account discrepancy, as represented by block 130; (4) the transaction machine 320 prompts, via the user interface 329, the user 302 to consent to the deposit account discrepancy, as represented by block 140; (5) the authorization apparatus 330 receives the user's 302 consent to the deposit account discrepancy, as represented by block 150; (6) the transaction machine 320 prompts, via the user interface 329, the user to consent to completing the transaction, as represented by block 160; (7) the authorization apparatus 330 receives, via the user interface 329, the user's 302 consent to completing the transaction, as represented by block 170; (8) the transaction machine 320 completes the transaction, as represented by block 180; and (9) the transaction machine 320 presents, via the user interface 329, the confirmation message 315 (via the receipt 306) to the user 302, where the confirmation message 315 includes information that confirms the user's 302 consent to the deposit account discrepancy and/or the user's 302 consent to completing the transaction, as represented by block 190. In accordance with some embodiments, the transaction machine 320 and/or the authorization apparatus 330 are each configured to send and/or receive one or more instructions to and/or from each other, such that an instruction sent from the authorization apparatus 330 to the transaction machine 320 (and/or vice versa) can trigger the transaction machine 320 (and/or vice versa) to perform one or more portions of any one or more of the embodiments described and/or contemplated herein.

Referring now to FIG. 4, a mixed block and flow diagram of a system 400 for providing a deposit account discrepancy service consent mechanism via a POS device and mobile phone is provided, in accordance with a more-detailed embodiment of the present invention. As shown, the system 400 includes a POS device 401, an authorization apparatus 403, and a mobile phone 405. The POS device 401 and the mobile phone 405 may each include a communication interface, a user interface, a processor, a memory, an application, and/or a datastore, and those devices may be operatively connected to each other.

It will be understood that the POS device 401 and the mobile phone 405 are operatively and selectively connected to the authorization apparatus 403 via one or more networks (not shown). It will be further understood that the POS device 401 and the mobile phone 405 are accessible to a user (not shown). Also, in accordance with some embodiments, the POS device 401 is maintained by a merchant, the mobile phone 405 is maintained by the user, and the authorization apparatus 403 is maintained by a bank where the user is a customer. Further, in accordance with some embodiments, the bank maintains the checking account associated with the debit card mentioned below.

As represented by block 402, the user swipes a debit card at the POS device 401 to initiate a debit card transaction (e.g., purchase transaction, etc.) involving the user and the merchant. Although not shown, the POS device 401 may also authenticate the user based at least partially on one or more credentials the user provides to the POS device. Next, as represented by block 404, the POS device 401 transmits an authorization request associated with the debit card transaction to the authorization apparatus 403. It will be understood that, in accordance with some embodiments, the authorization request includes information that, for example, identifies the user, the checking account associated with the debit card, the amount of the transaction, the one or more goods and/or services involved in the transaction, and/or the like. As represented by block 406, the authorization apparatus 403 then determines that the checking account associated with the debit card will incur a deposit account discrepancy as a result of the transaction. As represented by block 408, the authorization apparatus also determines that the user has not previously agreed to one or more terms of a deposit account discrepancy service (and/or opted into the deposit account discrepancy service) provided by the bank that maintains the checking account and the authorization apparatus 403.

Thereafter, as represented by block 410, the authorization apparatus 403 instructs the mobile phone 405 to prompt the user, via a user interface of the mobile phone, to agree to the one or more terms of the deposit account discrepancy service (and/or to opt into the deposit account discrepancy service). For example, in accordance with some embodiments, the authorization apparatus 403 sends a notification (e.g., email, text message, social media communication, etc.) to the user's mobile phone 405 during the time the user is waiting for the transaction to process at the POS device 401. In such embodiments, the notification (a) informs the user that the transaction may exceed the user's checking account balance, (b) informs the user that the user must agree to the terms of the deposit account discrepancy service in order to complete the transaction, and (c) prompts the user to agree to those terms via the mobile phone. In some embodiments, the notification is delivered visually to the user via a display of the mobile phone and/or audibly via a speaker of the mobile phone. After being prompted, the user agrees to the terms of the deposit account discrepancy service via a user interface associated with the mobile phone, as represented by block 412. For example, in some embodiments, the user agrees to the terms of the deposit account discrepancy service by pressing one or more buttons on the mobile phone and/or by touching one or more portions of the touchscreen display of the mobile phone.

Once the user has agreed to the terms of the deposit account discrepancy service, the authorization apparatus 403 stores (e.g., in computer-readable memory, etc.) the user's agreement to the terms of deposit account discrepancy service, as represented by block 414. In addition, the mobile phone 405 prompts the user, via a user interface of the mobile phone 405, to agree to completing the transaction, as represented by block 416. Afterwards, the user agrees to completing the transaction via the mobile phone 405, as represented by block 418, and then, as represented by block 420, the authorization apparatus 403 stores the user's agreement to completing the transaction (e.g., in computer-readable memory, etc.). In addition, as represented by block 422, the mobile phone 405 receives (e.g., from the authorization apparatus 403, etc.) an e-mail that confirms the user's agreement to the terms of the deposit account discrepancy service and/or that confirms the user's agreement to completing the transaction. After the user has agreed to completing the transaction, the authorization apparatus 403 authorizes the transaction request referred to in block 404, as represented by block 424, and the POS device 401 completes the transaction, as represented by block 426.

It will be understood that the embodiment illustrated in FIG. 4 is merely exemplary and that other embodiments may vary without departing from the scope and spirit of the present invention. For example, in some embodiments, one or more portions of the process flow being performed by the mobile phone 405 are performed instead by the POS device 401. As another example, in some alternative embodiments, the one or more of the portions of the process flow represented by blocks 402 and 426 are initiated, performed, completed, and/or facilitated by the mobile phone 405 instead of by the POS device 401 (e.g., instead of swiping the debit card at a POS device, the user inputs the debit card information into an merchant application executing on the mobile phone; instead of the POS device completing the transaction, the user completes the transaction via the mobile phone's web browser etc.). As still another example, in some embodiments, the one or more portions of the process flow performed by the POS device 401 are instead performed by an interactive bill pay kiosk (e.g., where the user wishes to incur a deposit account discrepancy in order to pay rent, an electric bill, a telephone bill, etc. at the bill pay kiosk, etc.). As a further example, in some alternative embodiments of the present invention, instead of involving a debit card, a checking account, a debit card transaction, and/or a deposit account discrepancy service, the process flow shown in FIG. 4 involves a credit card, a credit card account, a credit card transaction, and/or a credit account discrepancy service (e.g., a service provided by a financial institution, where the financial institution, at its discretion, extends additional credit to the user beyond the credit limit associated with the user's credit card account, etc.).

It will also be understood that, in some embodiments, one or more of the portions of the process flow represented by blocks 402-426 are triggered by one or more triggering events, which, in some embodiments, include the performance of one or more of the other portions of the process flow represented by blocks 402-426. Also, in some embodiments, the system 400 is configured to perform the entire process flow represented by blocks 402-426, from start to finish, within moments, seconds, and/or minutes. For example, in some embodiments, the user agrees to the terms of the deposit account discrepancy service and agrees to completing the transaction within approximately 1-15 minutes of the authorization apparatus 403 receiving the authorization request from the POS device 401. Further, it will be understood that one or more portions of the process flow represented by blocks 402-426 are configured to comply with one or more requirements of a deposit account discrepancy regulation (e.g., Regulation E in the United States, etc.).

Referring now to FIGS. 5-6, the exemplary display pages 500 and 600 of a touchscreen display associated with an ATM are provided, in accordance with an embodiment of the present invention. In this example embodiment, the pages 500 and 600 are both displayed on the same touchscreen display housed in, located near, and/or otherwise associated with a single ATM. Also, in this embodiment, the ATM is maintained by a bank, the user of the ATM (described below) is a customer of the bank, the user has a checking account maintained by the bank, and the transaction involving the user and the ATM involves a cash withdrawal transaction.

The touchscreen display that displays the pages 500 and 600 is configured to navigate from one page to the other page and vice versa (and to one or more other pages not shown). In accordance with some embodiments, the display pages 500 and 600 are embodied as portions of an ATM-specific application. In addition, it will be understood that, in some embodiments, the apparatus having the process flow 100, the apparatus having the process flow 200, the system having the process flow 300 (and/or one or more of the underlying apparatuses), and/or the system 400 are configured to implement any one or more embodiments of the present invention described and/or contemplated herein in connection with the display pages 500 and 600.

Referring now to FIG. 5, it will be understood that the display page 500 is displayed on the touchscreen display after and/or in response to an apparatus (e.g., the apparatus having the process flow 100, the authorization apparatus 330, the ATM associated with the touchscreen display, etc.) determining that the user's checking account will incur a deposit account discrepancy as a result of the cash withdrawal transaction. As shown, the display page 500 includes a header 502, information associated with the deposit account discrepancy 504, a prompt 506, a "No, Cancel" selectable digital button 507, and a "Yes, Continue" selectable digital button 508.

In this embodiment, the header 502 indicates that the cash withdrawal transaction may exceed the user's checking account balance. In addition, the information associated with the deposit account discrepancy 504 states that the amount of the cash withdrawal exceeds the current available balance for the checking account. The information 504 also indicates that the user can complete the cash withdrawal transaction if the user agrees to the ATM deposit account discrepancy services provided by the bank and agrees to let the bank confirm the user's agreement to the bank's deposit account discrepancy services on the next page (i.e., on display page 600). Further, the information 504 indicates that if the user continues with the cash withdrawal transaction and the checking account remains discrepant at the end of the business day (e.g., the end of the business day in which the transaction occurred, 5:00 pm, 11:59 pm, etc.), then the user and/or the checking account will incur a particular deposit account discrepancy service deposit account discrepancy item amount (e.g., $X, where X is some pre-defined number). The information associated with the deposit account discrepancy 504 also directs the user to the bank's website for more information related to the bank's deposit account discrepancy services and deposit account discrepancy amounts. The information 504 further states that if the checking account is discrepant some pre-defined number of consecutive business days (e.g., Y days, where Y is some pre-defined number), the user and/or the checking account will incur an additional pre-defined deposit account discrepancy service extended discrepant balance assessment that is also displayed on the ATM display. It will be understood that, in some embodiments, displaying the header 502 and/or displaying the information associated with the deposit account discrepancy 504 may comply with one or more requirements of a deposit account discrepancy regulation (e.g., Regulation E in the United States, etc.).

The display page 500 also shows the prompt 506, which asks the user if he or she agrees to the deposit account discrepancy services provided by the Bank. The prompt 506 also asks the user if he or she wants to continue with the cash withdrawal transaction. If the user agrees to the deposit account discrepancy services and wants to continue with the cash withdrawal transaction, the user may select the "Yes, Continue" selectable digital button 508, after which the touchscreen display will navigate to the display page 600. Also, if the user selects the "Yes, Continue" selectable digital button 508, then the user has agreed to the bank's deposit account discrepancy services and/or to one or more terms thereof. If the user does not agree to the deposit account discrepancy services, or if the user does not want to continue with the cash withdrawal transaction, the user may select the "No, Cancel" selectable digital button 507, after which the cash withdrawal transaction will be canceled. It will be understood that, in some embodiments, displaying the prompt 506 and/or receiving the user's selection (i.e., "Yes, Continue" or "No, Cancel") may comply with one or more requirements of a deposit account discrepancy regulation.

Referring now to FIG. 6, the display page 600 is displayed on the touchscreen display of the ATM after and/or in response to the user selecting the "Yes, Continue" selectable digital button 508 on the display page 500. As shown, the display page 600 includes a header 602, a confirmation message 604, a revocation statement 606, a prompt 608, a "No" selectable digital button 609, a "Yes" selectable digital button 610, and reminder information 611 associated with the deposit account discrepancy.

In this embodiment, the header 602 indicates that the display page 600 represents a confirmation page. In addition, the confirmation message 604 confirms the user's consent to the deposit account discrepancy, and more specifically, the user's agreement to the one or more terms of the bank-provided deposit account discrepancy service. The confirmation message 604 also states that the user's agreement is valid for this cash withdrawal transaction only and is not valid for one or more future transactions. In addition, the confirmation message 604 states that, as a reminder, the cash withdrawal transaction may exceed the user's checking account balance and cause the stated pre-defined deposit account discrepancy item amount to be assessed to the user and/or to the checking account. In addition, the confirmation message 604 further indicates that the user will receive a receipt along with the user's cash (if the user decides to complete the transaction). It will also be understood that, in some embodiments, presenting the confirmation message 604 to the user may comply with one or more requirements of a deposit account discrepancy regulation.

The display page 600 also shows the revocation statement 606, which notifies the user that the user may cancel the transaction by selecting the "No" button 609 if the user does not agree to the bank's deposit account discrepancy service. The display page 600 also shows the prompt 608, which asks the user if the user wants to complete the cash withdrawal transaction. If the user wishes to complete the transaction, the user may select the "Yes" selectable digital button 610, after which the ATM will complete the transaction (e.g., the ATM will dispense the cash associated with the cash withdrawal transaction, the ATM will print a receipt associated with the cash withdrawal transaction, etc.). However, if the user does not wish to complete the transaction, the user may select the "No" selectable digital button 609, after which the cash withdrawal transaction will be canceled. It will be understood that if the user selects the "Yes" selectable digital button 610, then the user has provided his or her consent to completing the transaction. It will also be understood that, in some embodiments, presenting the revocation statement 606, displaying the prompt 608, and/or receiving the user's selection (i.e., "Yes, Continue" or "No, Cancel") may comply with one or more requirements of a deposit account discrepancy regulation.

Also shown in the display page 600 is the reminder information 611. In accordance with some embodiments, the reminder information 611 repeats at least some of the information 504 that was displayed on the display page 500. For example, as shown in FIG. 6, the reminder information 611 reminds the user that if the user's checking account is discrepant for some pre-defined and stated number of consecutive days, an additional stated pre-defined extended discrepant balance assessment will be assessed to the user's account. In addition, in accordance with some embodiments, the reminder information 611 includes information that was not included in the information 504. For example, as shown in FIG. 6, the reminder information 611 notifies the user that the bank pays deposit account discrepancies at its discretion and that the bank does not guarantee that the bank will pay deposit account discrepancies in the future. In addition, the reminder information 611 states that the user is responsible for repaying deposit account discrepancies immediately. It will be understood that, in some embodiments, presenting the reminder information 611 may comply with one or more requirements of a deposit account discrepancy regulation.

It will be understood that the display pages 500 and 600 can be different in other embodiments of the present invention. For example, in some embodiments, the display pages 500 and 600 (or variations thereof) are displayed on a touchscreen display that is housed in, located near, and/or otherwise associated with a transaction machine that is not an ATM (e.g., POS device, bill pay kiosk, vending machine, personal computer, mobile phone, self-checkout machine, etc.). As another example, in some embodiments, the display pages 500 and 600 are not embodied as portions of an ATM-specific application but are instead embodied as portions of some other transaction machine-specific application, such as, for example, portions of a mobile phone application, a bill pay application, a dashboard application, a portal application, intranet pages, Internet web pages, and/or the like.

Referring now to FIG. 7, an exemplary receipt 700 from an ATM cash withdrawal transaction is provided, in accordance with an embodiment of the present invention. In accordance with some embodiments, the receipt 700 is printed in response to a cash withdrawal transaction performed at an ATM, where the transaction involves a checking account associated with a user of the ATM. Also, it will be understood that the checking account will incur a deposit account discrepancy as a result of the cash withdrawal transaction because, for example, the checking account is already discrepant and/or because the checking account does not have sufficient available funds to cover the cash withdrawal transaction. It will also be understood that, in accordance with some embodiments, the receipt 700 is printed by the ATM referred to in connection with FIGS. 5 and 6, and that the ATM prints the receipt after displaying (and/or during the display of) the display pages 500 and 600 on the ATM display.

As shown in FIG. 7, the receipt 700 includes transaction information 702. In accordance with some embodiments, the transaction information 702 indicates, for example, the time and date of the transaction (i.e., "Aug. 24, 2010 14:52"), when the transaction will post to the checking account (i.e., "Aug. 25, 2010"), a description of the transaction (i.e., "Gas Station #123"), and/or the type of the transaction (i.e., "Withdrawal"). In addition, in accordance with some embodiments, the transaction information 702 identifies the checking account involved in the transaction (i.e., "primary checking"). The transaction information 702 can also identify the available balance for the checking account (i.e., "−$25.24"), where that available balance amount represents the available balance immediately prior to the transaction and/or the available balance as a result of the transaction.

In addition to the transaction information 702, the receipt 700 includes a confirmation message 704 that confirms the user's consent to the deposit account discrepancy. More specifically, the confirmation message 704 confirms the user's agreement to one or more terms of a deposit account discrepancy service provided by the bank that maintains the ATM. In particular, the confirmation message 704 notifies the user that the bank has received the user's agreement to the bank's deposit account discrepancy services and that the user's agreement is valid for this cash withdrawal transaction but not for one or more future transactions. In addition, the confirmation message 704 notifies the user that the cash withdrawal transaction may exceed the user's checking account balance and result in one or more deposit account discrepancy amounts. It will be understood that, in some embodiments, printing the transaction information 702 and/or the confirmation message 704 on the receipt 700 may comply with one or more requirements of a deposit account discrepancy regulation.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method comprising:
providing disclosure information to a user prior to receiving transaction request information associated with a transaction, wherein the disclosure information defines one or more terms of a deposit account discrepancy service;
receiving transaction request information associated with a transaction, wherein the transaction involves a transaction machine and the user, wherein the transaction request information is received via the transaction machine, and wherein the transaction information request information identifies an account of the user;
determining, based at least partially on the transaction request information, that the account will incur a deposit account discrepancy as a result of the transaction;
in response to determining the account will incur a deposit account discrepancy as a result of the transaction, presenting, via a user interface associated with the transaction machine, reminder information associated with the one or more terms of the deposit account discrepancy service, wherein the reminder information indicates that if the account is discrepant for a pre-defined number of consecutive days an extended deposit account discrepancy amount will be assessed to the user's account;
after presenting information associated with the determined deposit account discrepancy, prompting, via a user interface in real-time at the time of the transaction request, the user to consent to the deposit account discrepancy, wherein prompting the user to consent to the deposit account discrepancy comprises prompting the user to agree to the one or more terms of the deposit account discrepancy service defined in the disclosure information, wherein at least one term of the deposit account discrepancy service is presented in the reminder information, and wherein receiving the user's consent to the deposit account discrepancy comprises receiving the user's agreement to the one or more terms of the deposit account discrepancy service;
receiving, via the user interface in real-time at the time of the transaction request, the user's consent to the deposit account discrepancy, wherein the user's consent to the deposit account discrepancy comprises the user's consent to completing the transaction using the deposit account discrepancy service;
authenticating the user, wherein the user's consent to the deposit account discrepancy service is only accepted if the user's identity is authenticated;
presenting, via the user interface, a confirmation message to the user, wherein the confirmation message comprises information that confirms the user's consent to the deposit account discrepancy;
assessing the account a deposit account discrepancy amount based at least partially on determining the account settles negative at the end of day, wherein assessing the account a deposit discrepancy amount further comprises determining whether or not to assess the account an extended deposit account discrepancy amount, in response to determining whether or not the account has been discrepant for a pre-defined number of consecutive days; and
determining not to assess the account a deposit account discrepancy amount based at least partially on determining that the account settles non-negative at the end of day.

2. The method of claim 1, further comprising:
completing the transaction based at least partially on the receiving the user's consent to the deposit account discrepancy.

3. The method of claim 1, further comprising:
prompting, via the user interface, the user to consent to completing the transaction; and
receiving, via the user interface, the user's consent to completing the transaction.

4. The method of claim 3, further comprising:
completing the transaction based at least partially on the receiving the user's consent to completing the transaction.

5. The method of claim 3, wherein the confirmation message comprises information that confirms the user's consent to completing the transaction.

6. The method of claim 1, wherein the transaction machine comprises an automated teller machine (ATM).

7. The method of claim 6, wherein the transaction comprises a cash withdrawal from the account.

8. The method of claim 1, wherein the transaction machine comprises a point of sale device.

9. The method of claim 1, wherein the presenting the confirmation message to the user comprises printing a receipt for the user, wherein the receipt comprises information that confirms the user's consent to the deposit account discrepancy.

10. The method of claim 1, wherein the user's consent to the deposit account discrepancy is valid for the transaction but not for one or more future transactions.

11. The method of claim 1, wherein the information associated with the deposit account discrepancy comprises information associated with a deposit account discrepancy amount.

12. The method of claim 1, wherein at least one of the presenting the information associated with the deposit account discrepancy, the receiving the user's consent to the deposit account discrepancy, or the presenting the confirmation message to the user complies with one or more requirements of a deposit account discrepancy regulation.

13. The method of claim 1, wherein the confirmation message comprises information that confirms the user's agreement to the one or more terms of the deposit account discrepancy service.

14. The method of claim 1, wherein the prompting the user to consent to the deposit account discrepancy comprises prompting the user to agree to one or more terms of a deposit account discrepancy service for the transaction only, and wherein the receiving the user's consent to the deposit account discrepancy comprises receiving the user's agreement to the one or more terms of the deposit account discrepancy service for the transaction only.

15. An apparatus comprising:
a user interface associated with a transaction machine, wherein the user interface is configured to receive one or more inputs from a user of the transaction machine and communicate one or more outputs to the user; and
a processor operatively connected to the user interface and configured to:
provide disclosure information to a user prior to receiving transaction request information associated with a transaction, wherein the disclosure information defines one or more terms of a deposit account discrepancy service;
receive transaction request information associated with a transaction, wherein the transaction involves a transaction machine and the user, wherein the transaction request information is received via the transaction machine, and wherein the transaction information request information identifies an account of the user;
determine, based at least partially on the transaction request information, that the account will incur a deposit account discrepancy as a result of the transaction;
in response to determining the account will incur a deposit account discrepancy as a result of the transaction, present, via the user interface, reminder information associated with the one or more terms of the deposit account discrepancy service, wherein the reminder information indicates that if the account is discrepant for a pre-defined number of consecutive days an extended deposit account discrepancy amount will be assessed to the user's account;
after presenting information associated with the determined deposit account discrepancy, prompt, via a user interface in real-time at the time of the transaction request, the user to consent to the deposit account discrepancy, wherein the processor is configured to prompt the user to consent to the deposit account discrepancy by prompting the user to agree to one or more terms of the deposit account discrepancy service defined in the disclosure information, wherein at least one term of the deposit account discrepancy service is presented in the reminder information, and wherein the processor is configured to receive the user's consent to the deposit account discrepancy by receiving the user's agreement to the one or more terms of the deposit account discrepancy service;
receive, via the user interface in real-time at the time of the transaction request, the user's consent to the deposit account discrepancy, wherein the user's consent to the deposit account discrepancy comprises the user's consent to completing the transaction using the deposit account discrepancy service;
authenticate the user and accept the user's consent based at least partially on authentication of the user;
present, via the user interface, a confirmation message to the user, wherein the confirmation message comprises information that confirms the user's consent to the deposit account discrepancy;
assess the account a deposit account discrepancy amount if the account settles negative at the end of day, wherein assessing the account a deposit discrepancy amount further comprises determining whether or not to assess the account an extended deposit account discrepancy amount, in response to determining whether or not the account has been discrepant for a pre-defined number of consecutive days; and
determine not to assess the account a deposit account discrepancy amount if the account settles non-negative at the end of day.

16. The apparatus of claim 15, wherein the processor is further configured to complete the transaction based at least partially on the processor receiving the user's consent to the deposit account discrepancy.

17. The apparatus of claim 15, wherein the processor is further configured to:
prompt, via the user interface, the user to consent to completing the transaction; and
receive, via the user interface, the user's consent to completing the transaction.

18. The apparatus of claim 17, wherein the processor is further configured to complete the transaction based at least partially on the processor receiving the user's consent to completing the transaction.

19. The apparatus of claim 17, wherein the confirmation message comprises information that confirms the user's consent to completing the transaction.

20. The apparatus of claim 15, wherein the processor is housed in the transaction machine.

21. The apparatus of claim 15, wherein the processor is housed in a server located remotely from the transaction machine.

22. The apparatus of claim 15, wherein the processor is configured to present the confirmation message to the user by printing a receipt for the user, wherein the receipt comprises information that confirms the user's consent to the deposit account discrepancy.

23. The apparatus of claim 15, wherein at least one of the processor presenting the information associated with the deposit account discrepancy, receiving the user's consent to the deposit account discrepancy, or presenting the confirmation message to the user complies with one or more requirements of a deposit account discrepancy regulation.

24. The apparatus of claim 15, wherein the confirmation message comprises information that confirms the user's agreement to the one or more terms of the deposit account discrepancy service.

25. The apparatus of claim 15, further comprising:
a memory device communicably coupled to the processor, wherein the memory device comprises information stored therein about whether the user was mailed disclosure information prior to the processor receiving the transaction information,
wherein the disclosure information defines one or more terms of a deposit account discrepancy service, and
wherein the processor is configured to communicate with the memory device and complete the transaction based at least partially on whether the user was mailed disclosure information prior to the processor receiving the transaction information.

26. The apparatus of claim 15, further comprising:
a memory device communicably coupled to the processor, wherein the processor is configured to record in the memory device that the user consented to the deposit account discrepancy for the transaction.

27. A computer program product comprising a non-transitory computer-readable medium, wherein the computer-readable medium comprises computer-executable program code portions stored therein, and wherein the computer-executable program code portions comprise:
a first program code portion operable to provide disclosure information to a user prior to receiving transaction request information associated with a transaction, wherein the disclosure information defines one or more terms of a deposit account discrepancy service;
a second program code portion operable to receive transaction request information associated with a transaction, wherein the transaction request information is received via a transaction machine, and wherein the transaction request information identifies an account of the user;
a third program code portion operable to determine, based at least partially on the transaction request information, that the account will incur a deposit account discrepancy as a result of the transaction;
a fourth program code portion operable to in response to determining the account will incur a deposit account discrepancy as a result of the transaction, present, via a user interface associated with the transaction machine, reminder information associated with the one or more terms of the deposit account discrepancy service, wherein the reminder information indicates that if the account is discrepant for a pre-defined number of consecutive days an extended deposit account discrepancy amount will be assessed to the user's account;
a fifth program code portion operable to after presenting information associated with the determined deposit account discrepancy, prompt, via a user interface in real-time at the time of the transaction request, the user to consent to the deposit account discrepancy;
a sixth program code portion operable to receive, via the user interface in real-time at the time of the transaction request, the user's consent to the deposit account discrepancy;
a seventh program code portion operable to authenticate the user, wherein the user's consent to the deposit account discrepancy service is only accepted if the user's identity is authenticated;
an eighth program code portion operable to present, via the user interface, a confirmation message to the user, wherein the confirmation message comprises information that confirms the user's consent to the deposit account discrepancy;
a ninth program code portion operable to assess the account a deposit account discrepancy amount based at least partially on determining the account settles negative at the end of day, wherein assessing the account a deposit discrepancy amount further comprises determining whether or not to assess the account an extended deposit account discrepancy amount, in response to determining whether or not the account has been discrepant for a pre-defined number of consecutive days; and
a tenth program code portion operable to determine not to assess the account a deposit account discrepancy amount based at least partially on determining that the account settles non-negative at the end of day.

28. The computer program product of claim 27, further comprising:
an eleventh program code portion operable to complete the transaction based at least partially on the sixth program code receiving the user's consent to the deposit account discrepancy.

29. The computer program product of claim 27, further comprising:
an eleventh program code portion operable to prompt, via the user interface, the user to consent to completing the transaction; and
a twelfth program code portion operable to receive, via the user interface, the user's consent to completing the transaction.

30. The computer program product of claim 29, further comprising:
a thirteenth program code portion operable to complete the transaction based at least partially on the eleventh program code portion receiving the user's consent to completing the transaction.

31. The computer program product of claim 29, wherein the confirmation message comprises information that confirms the user's consent to completing the transaction.

32. The computer program product of claim 27, wherein the eighth program code portion is operable to print a receipt for the user, wherein the receipt comprises information that confirms the user's consent to the deposit account discrepancy.

33. The computer program product of claim 27, wherein at least one of the third program code portion, fifth program code portion, sixth, seventh, eighth, or ninth program code portion complies with one or more requirements of a deposit account discrepancy regulation.

34. The computer program product of claim 27, further comprising:
an eleventh program code portion operable to send disclosure information to the user prior to the first program code portion receiving the transaction information, wherein the disclosure information defines one or more terms of a deposit account discrepancy service, and
wherein the fifth program code portion is operable to prompt the user to agree to the one or more terms of the deposit account discrepancy service defined in the disclosure information.

35. The computer program product of claim 27, wherein the fifth program code portion is operable to prompt the user to agree to one or more terms of a deposit account discrepancy service, and wherein the sixth program code portion is operable to receive the user's agreement to the one or more terms of the deposit account discrepancy service.

* * * * *